(12) United States Patent
Honda et al.

(10) Patent No.: US 12,422,377 B2
(45) Date of Patent: Sep. 23, 2025

(54) DEFECT INSPECTION APPARATUS AND DEFECT INSPECTION METHOD

(71) Applicant: Hitachi High-Tech Corporation, Tokyo (JP)

(72) Inventors: Toshifumi Honda, Tokyo (JP); Takanori Kondo, Tokyo (JP); Nobuhiro Obara, Tokyo (JP); Masami Makuuchi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 202 days.

(21) Appl. No.: 17/922,171

(22) PCT Filed: Jun. 2, 2020

(86) PCT No.: PCT/JP2020/021828
§ 371 (c)(1),
(2) Date: Oct. 28, 2022

(87) PCT Pub. No.: WO2021/245810
PCT Pub. Date: Dec. 9, 2021

(65) Prior Publication Data
US 2023/0175979 A1    Jun. 8, 2023

(51) Int. Cl.
*G01N 21/95* (2006.01)
*G01N 21/47* (2006.01)
*G01N 21/88* (2006.01)

(52) U.S. Cl.
CPC ......... *G01N 21/9501* (2013.01); *G01N 21/47* (2013.01); *G01N 21/88* (2013.01); *G01N 2021/4711* (2013.01); *G01N 2201/02* (2013.01)

(58) Field of Classification Search
CPC ............... G01N 21/88; G01N 21/9505; G01N 21/9501; G01N 21/47; G01N 2021/4792;
(Continued)

(56) References Cited

U.S. PATENT DOCUMENTS 6,456,951 B1 *   9/2002   Maeda .................... H01L 22/20
                                                     702/81
2003/0130806 A1 *  7/2003   Mizuno ................... H01L 22/20
                                                     702/35
(Continued)

FOREIGN PATENT DOCUMENTS

JP          9-79989 A      3/1997
JP          3255292 B2     2/2002
(Continued)

OTHER PUBLICATIONS

International Preliminary Report on Patentability (PCT/IB/338) issued in PCT Application No. PCT/JP2020/021828 dated Dec. 8, 2022, including English translation of document C3 (Japanese-language International Preliminary Report on Patentability (PCT/IPEA/409) filed Oct. 28, 2022) (four (4) pages).
(Continued)

*Primary Examiner* — Kara E. Geisel
*Assistant Examiner* — Jonathon Cook
(74) *Attorney, Agent, or Firm* — Crowell & Moring LLP

(57) ABSTRACT

Provided is a defect inspection apparatus including a plurality of detection optical systems for collecting illumination scattered light from the surface of a sample, a plurality of sensors for converting the illumination scattered light collected by the corresponding detection optical systems into electrical signals and outputting detection signals, and a signal processing device for processing the detection signals input from the plurality of sensors, wherein the signal processing device generates a first signal group including an integrated signal obtained by adding a plurality of detection signals in a predetermined combination based on a group of detection signals input from the plurality of sensors, generates a second signal group by performing the filtering processing on each signal that configures the first signal group, generates a third signal group including separated
(Continued)

signals separated according to a predetermined rule from the signal corresponding to the integrated signal based on the second signal group, and detects or classifies defects based on the third signal group to store defect inspection data in a memory.

9 Claims, 12 Drawing Sheets

(58) Field of Classification Search
CPC ... G01N 2021/8854; G01N 2021/8874; G01N 2021/8883; G01N 2021/4704; G01N 2021/4709; G01N 2021/4711
See application file for complete search history.

(56) References Cited

U.S. PATENT DOCUMENTS

| | | |
|---|---|---|
| 2007/0182958 A1 | 8/2007 | Manabe et al. |
| 2009/0073440 A1 | 3/2009 | Tiemeyer |
| 2010/0060895 A1* | 3/2010 | Oshima ............... G01N 21/9501 356/369 |
| 2012/0092656 A1 | 4/2012 | Nakao et al. |
| 2012/0293795 A1 | 11/2012 | Urano et al. |
| 2013/0003052 A1* | 1/2013 | Nakao ................ G01N 21/9501 356/237.5 |
| 2016/0116419 A1 | 4/2016 | Pavani |
| 2017/0146463 A1* | 5/2017 | Honda ............... G01N 21/9501 |
| 2020/0226743 A1* | 7/2020 | Savchenko ........ G01N 21/9501 |
| 2020/0256804 A1* | 8/2020 | Honda ............... G01N 21/8806 |
| 2020/0371047 A1* | 11/2020 | Honda ................. G01N 21/47 |
| 2022/0067902 A1* | 3/2022 | Dou ....................... G06T 7/001 |

FOREIGN PATENT DOCUMENTS

| | | |
|---|---|---|
| JP | 2007-240512 A | 9/2007 |
| JP | 2011-13058 A | 1/2011 |
| JP | 2011-179823 A | 9/2011 |
| JP | 2012117898 A * | 6/2012 |
| WO | WO 2019/159334 A1 | 8/2019 |

OTHER PUBLICATIONS

International Search Report (PCT/ISA/210) issued in PCT Application No. PCT/JP2020/021828 dated Sep. 1, 2020 with English translation (five (5) pages).

Japanese-language Written Opinion (PCT/ISA/237) issued in PCT Application No. PCT/JP2020/021828 dated Sep. 1, 2020 (four (4) pages).

Japanese-language International Preliminary Report on Patentability (PCT/IPEA/409) issued in PCT Application No. PCT/JP2020/021828 dated Jun. 2, 2020, including Annexes with partial English translation (15 pages).

* cited by examiner

[FIG. 1]
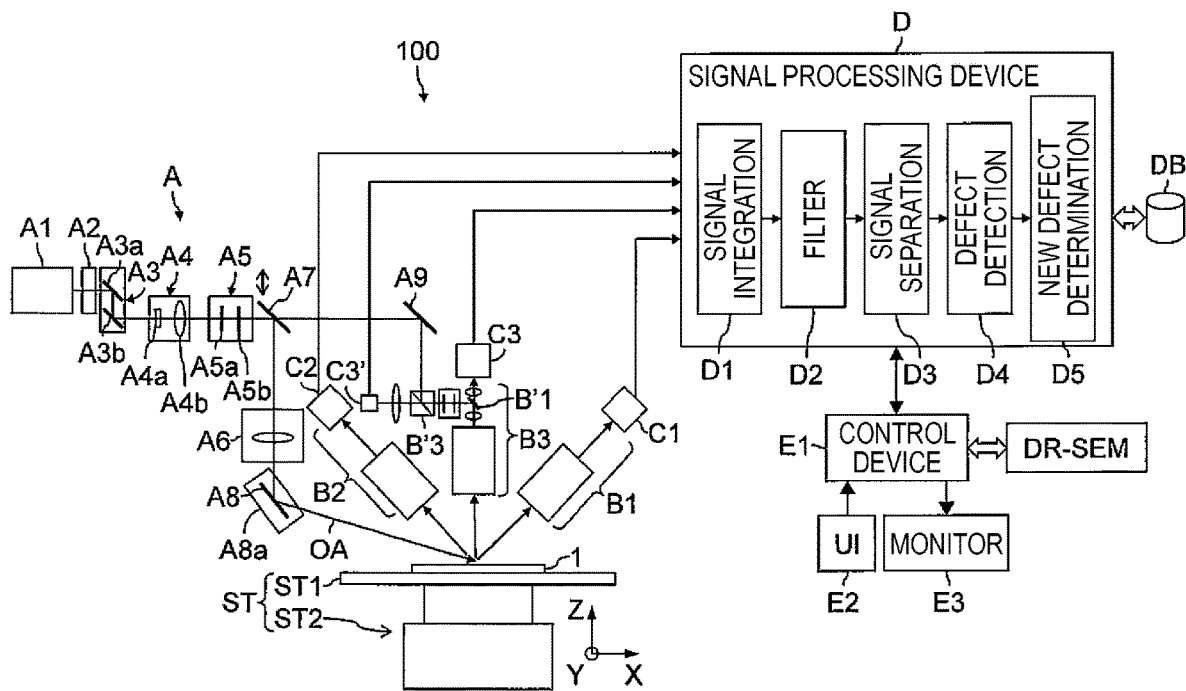
[FIG. 2]
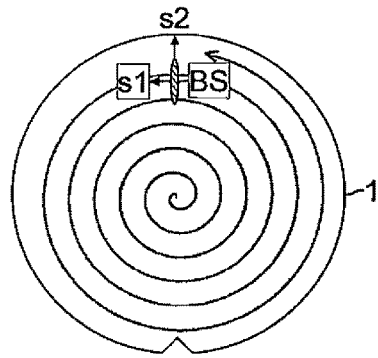
[FIG. 3]
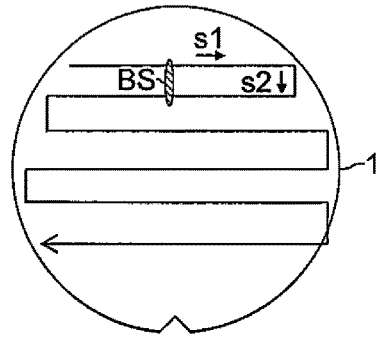

[FIG. 4]
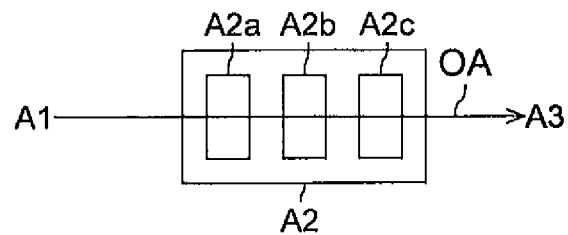
[FIG. 5]
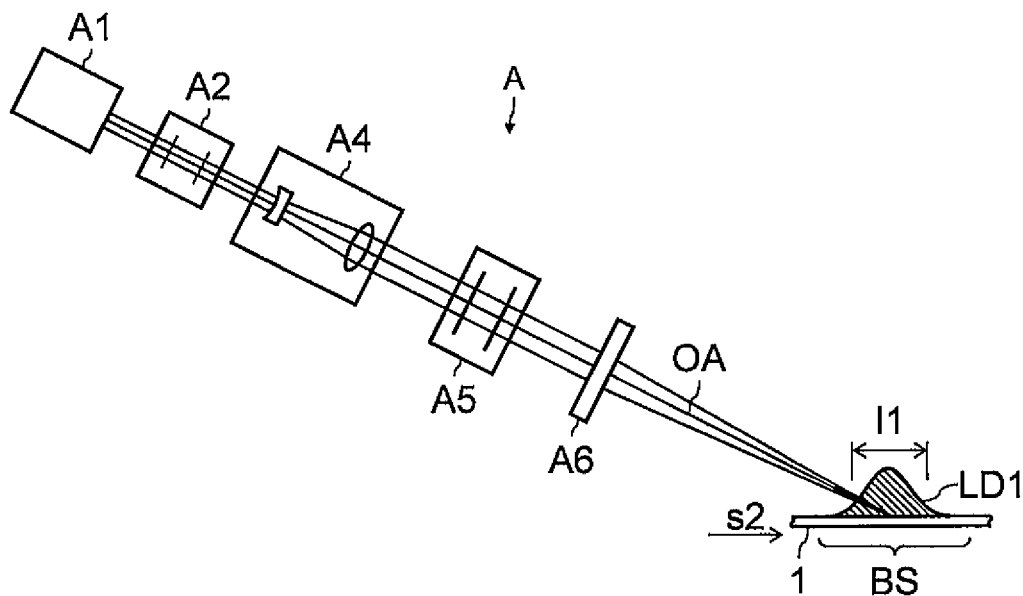
[FIG. 6]
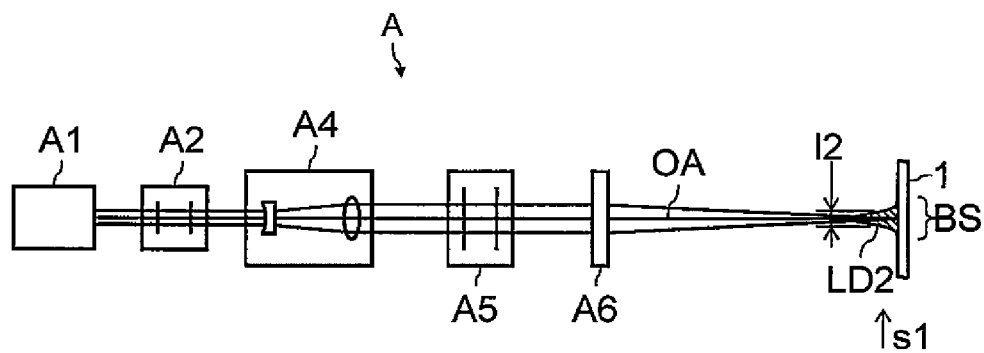

[FIG. 7]
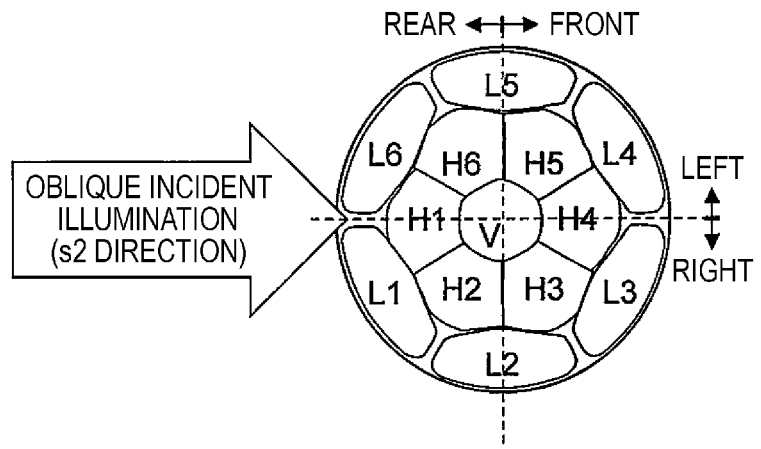
[FIG. 8]
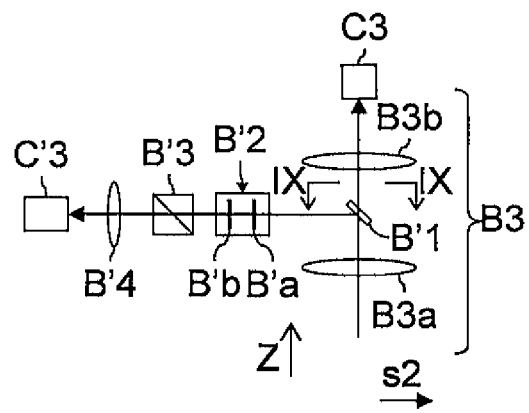
[FIG. 9]
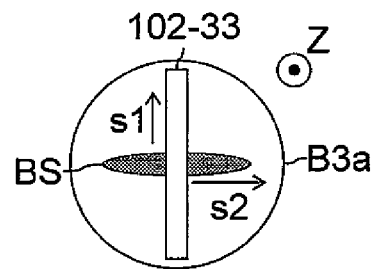

[FIG. 10]
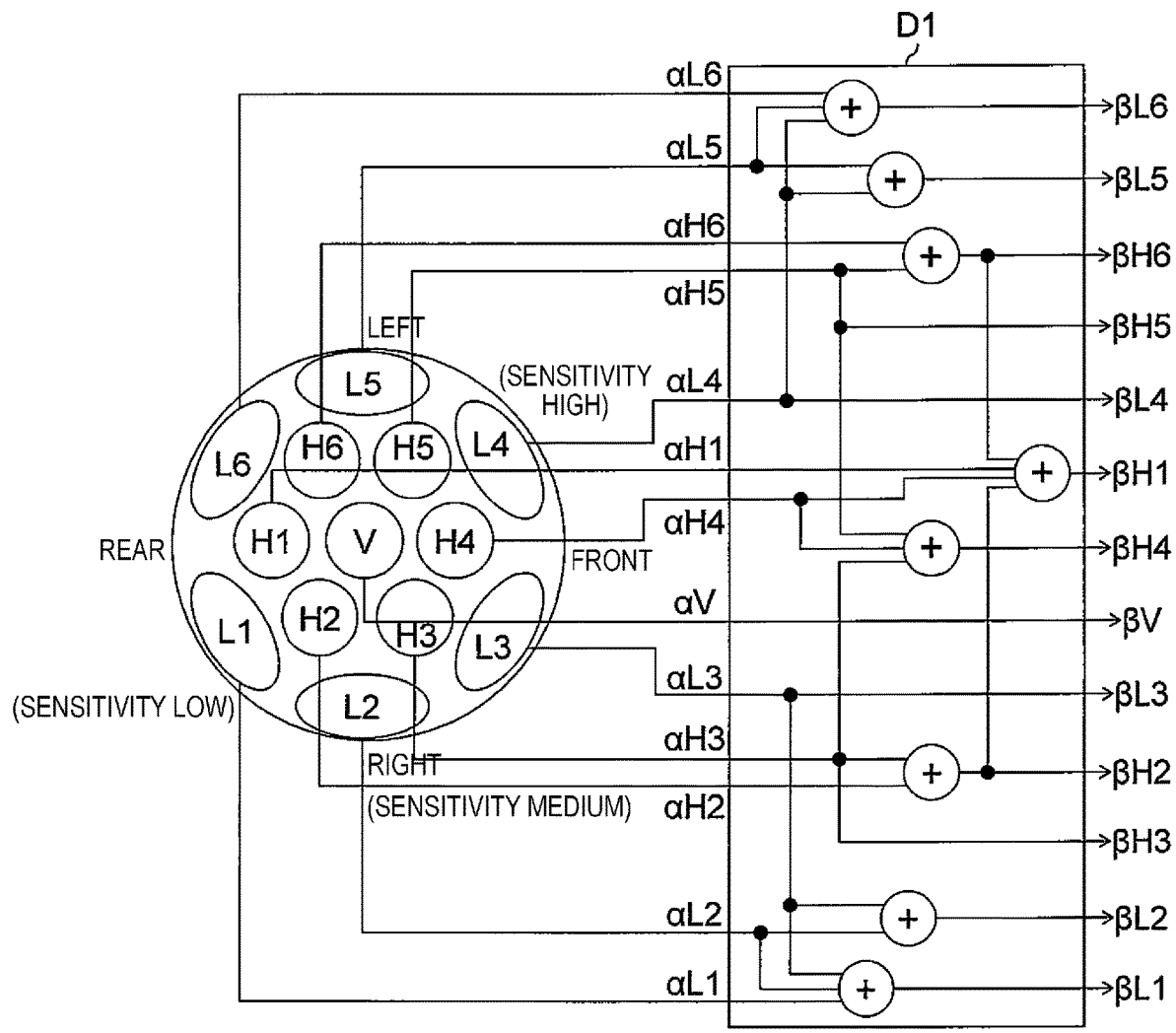
[FIG. 11]
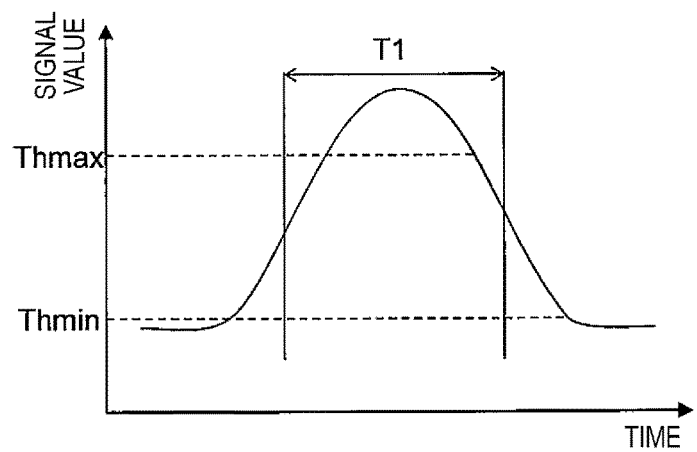

[FIG. 12]
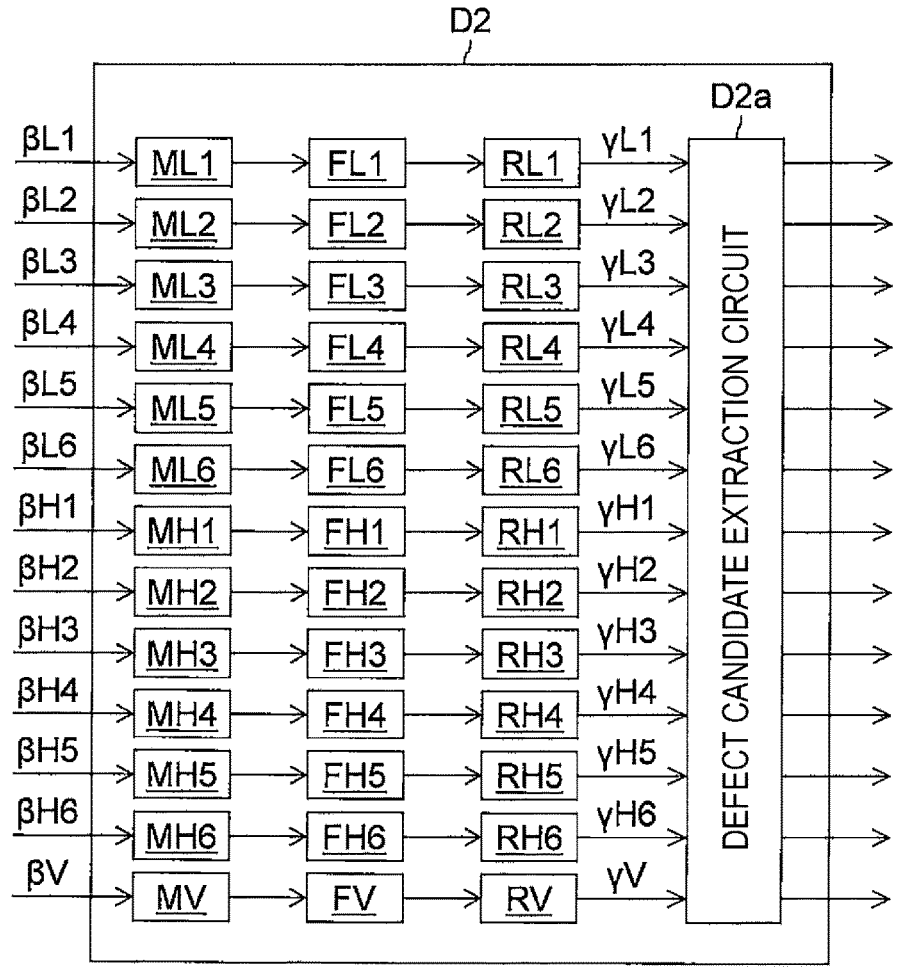
[FIG. 13]
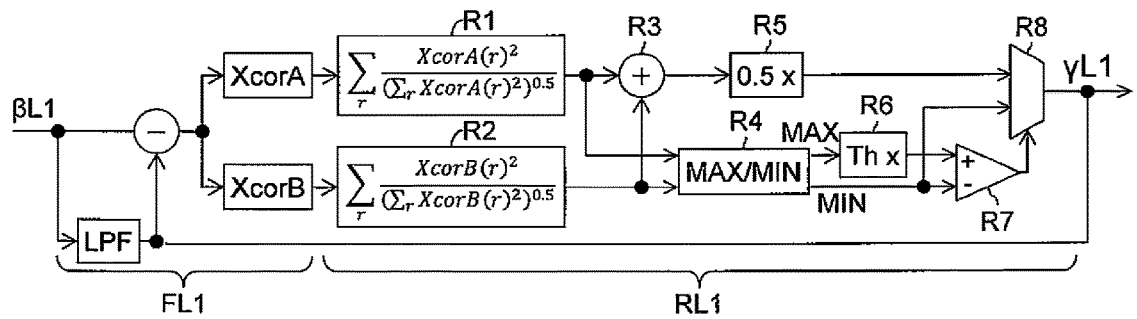
[FIG. 14]
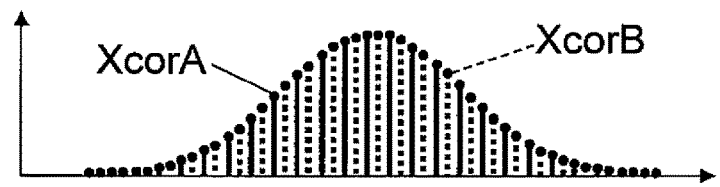

[FIG. 15]
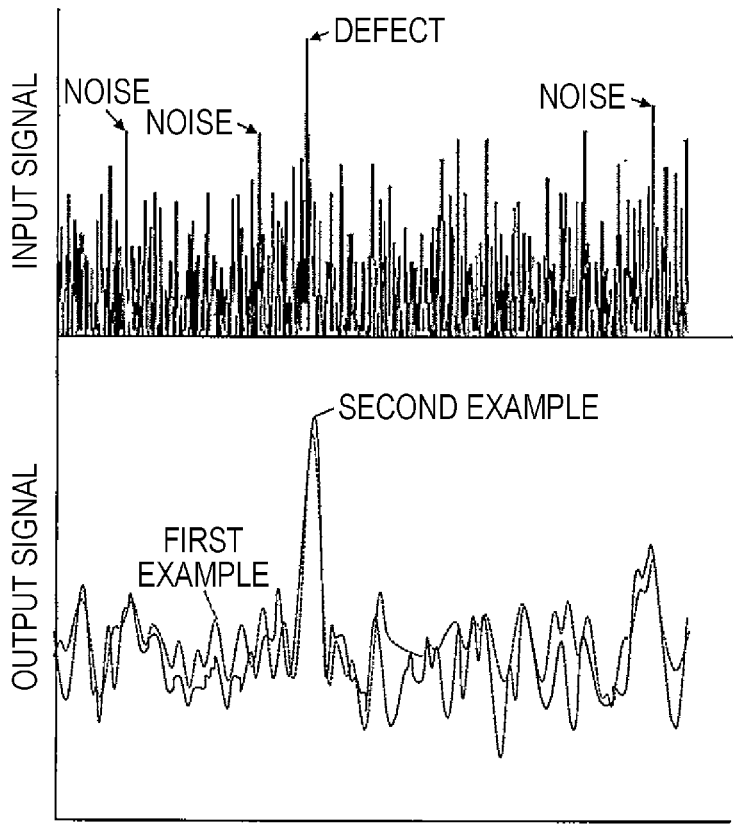
[FIG. 16]
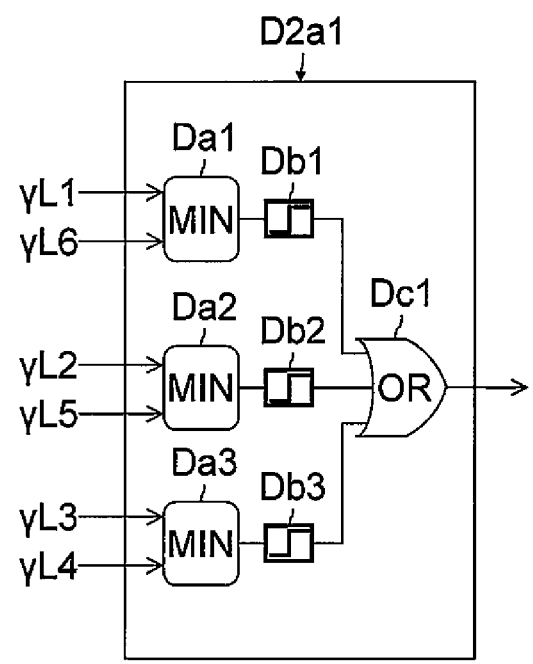

[FIG. 17]
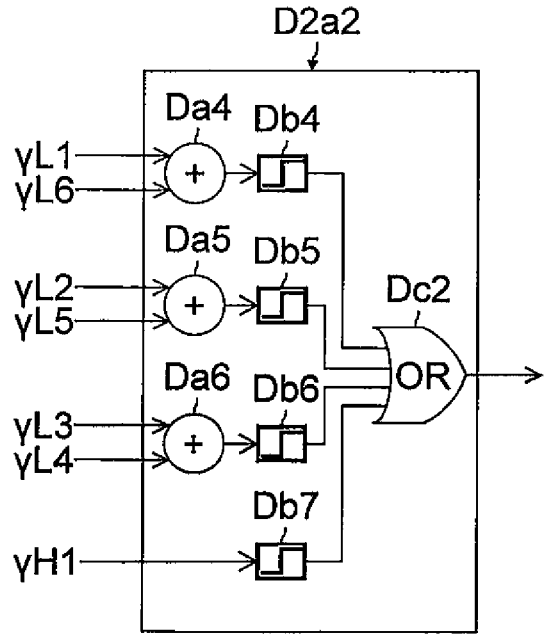
[FIG. 18]
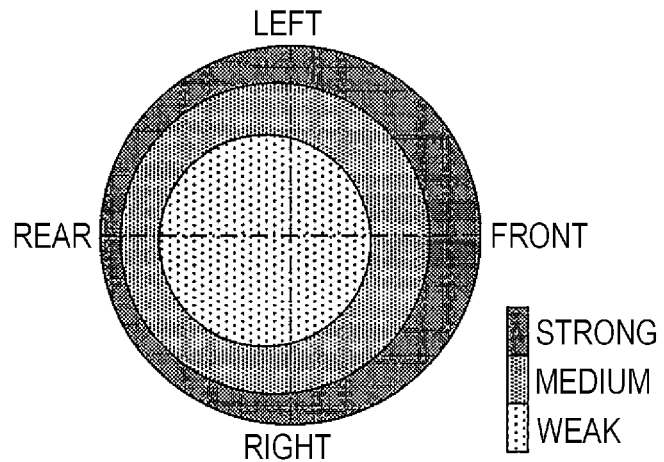
[FIG. 19]
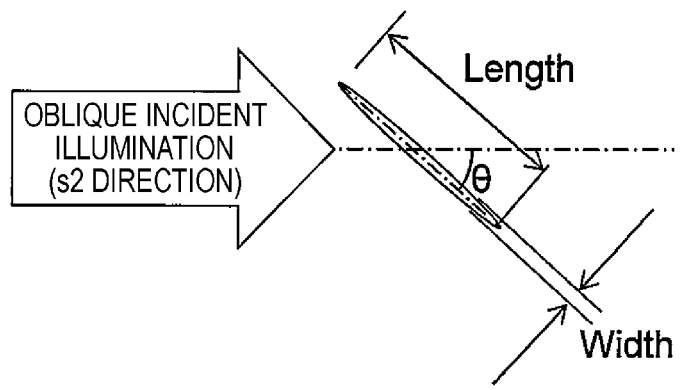

[FIG. 20]
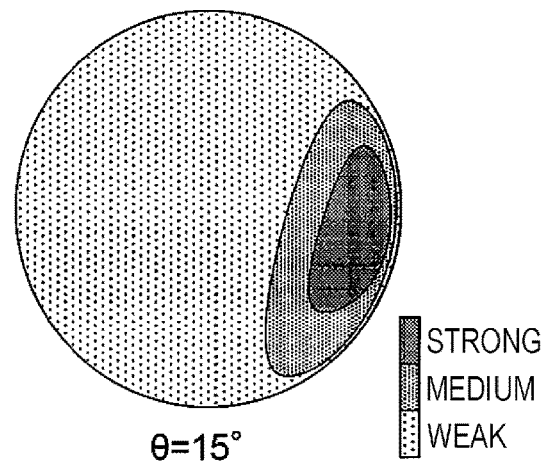
θ=15°
[FIG. 21]
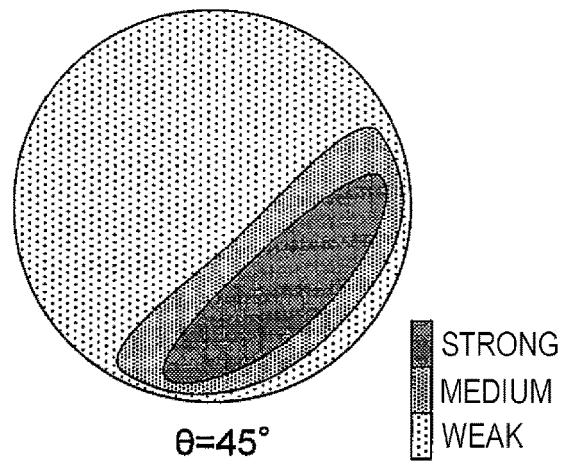
θ=45°
[FIG. 22]
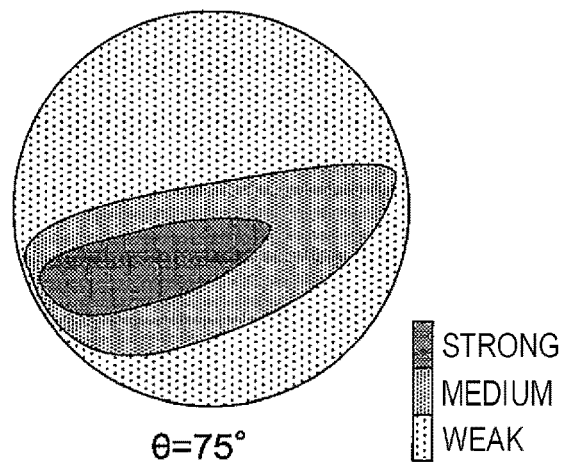
θ=75°

[FIG. 23]
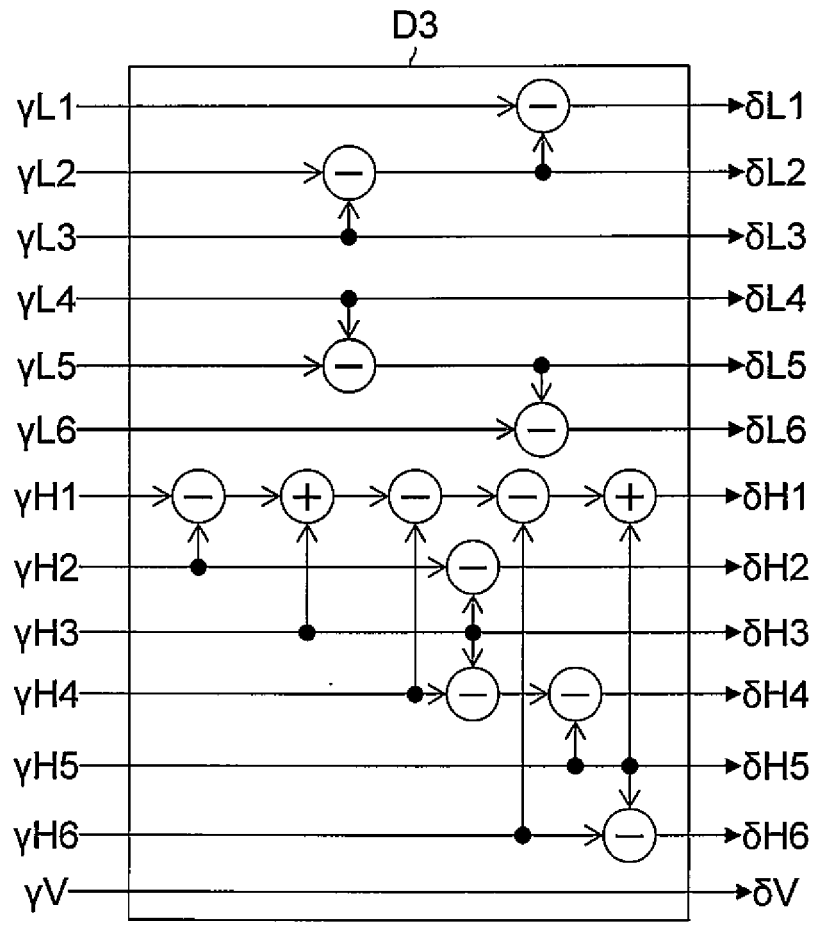
[FIG. 24]
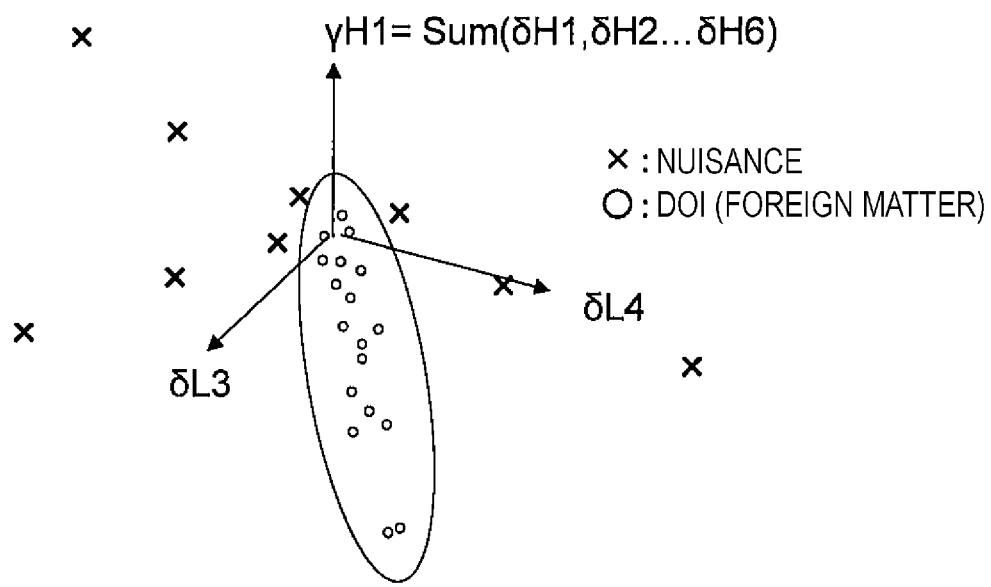

[FIG. 25]
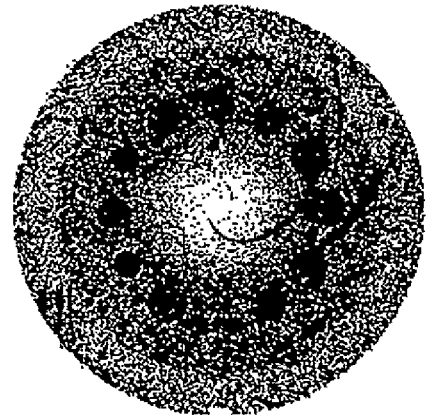
[FIG. 26]
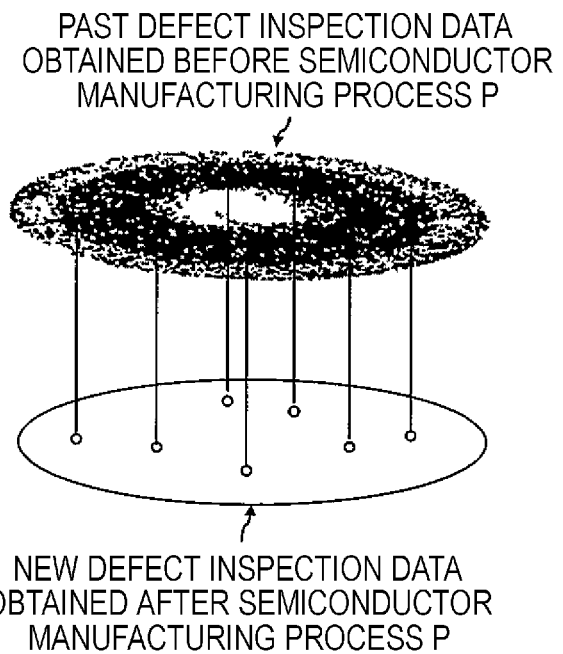

[FIG. 27]
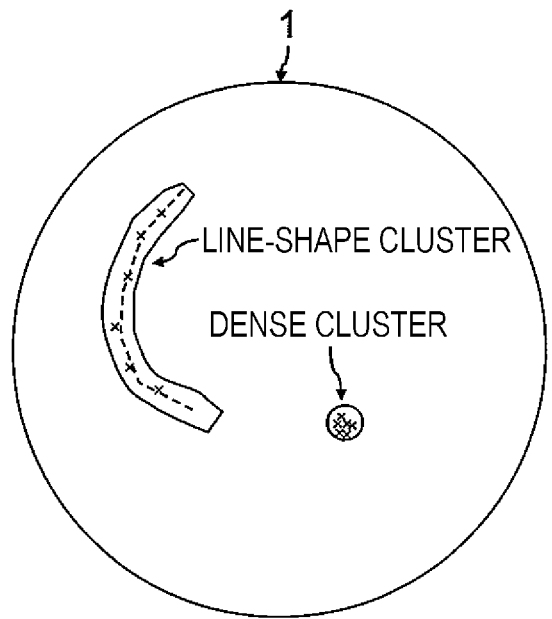
[FIG. 28]
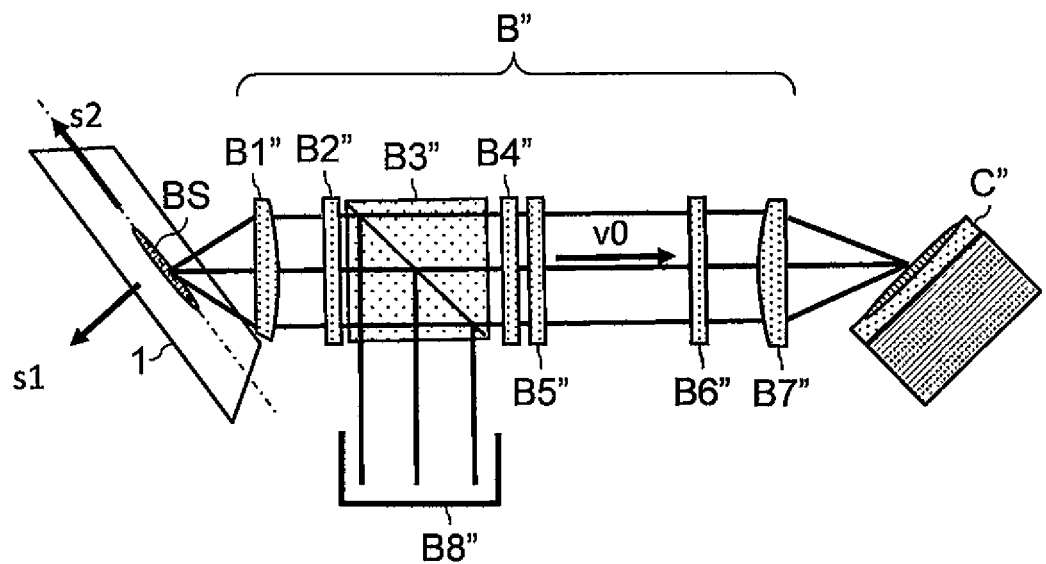

[FIG. 29]
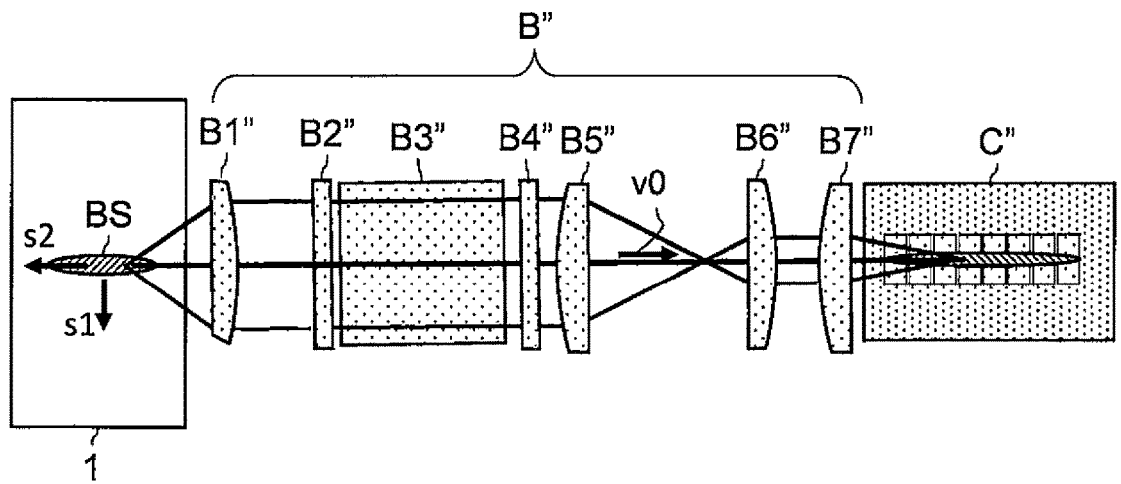
[FIG. 30]
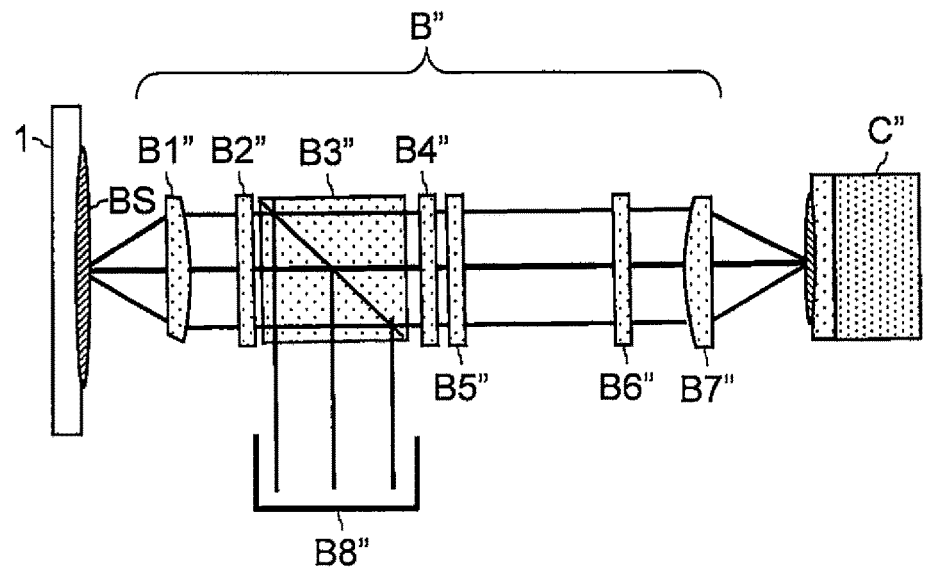

DEFECT INSPECTION APPARATUS AND DEFECT INSPECTION METHOD

TECHNICAL FIELD

The present invention relates to a defect inspection apparatus and a defect inspection method for inspecting a sample surface and outputting the position, type, size, and the like of a defect.

BACKGROUND ART

In the production line of semiconductor substrates, thin film substrates, and the like, defects on the surfaces of semiconductor substrates, thin film substrates, and the like are inspected to improve the yield of products. As a defect inspection apparatus used for the defect inspection, an apparatus is known that simultaneously detects scattered light from the sample surface with a plurality of sensors having different positions and obtains detailed information on the position, shape, size and the like of the defect (See JP-A-2011-013058 (PTL 1) and the like).

CITATION LIST

Patent Literature

PTL 1: JP-A-2011-013058

SUMMARY OF INVENTION

Technical Problem

For example, various materials used in the semiconductor manufacturing process may contain extremely small foreign matters of nanometer order. In recent years, defect inspection apparatuses have been required to have the ability to detect such extremely small defects. In the defect inspection apparatus of JP-A-2011-013058 (PTL 1), a plurality of detection optical systems are arranged in different directions with respect to the illumination spot, and many pieces of information about defects can be obtained by simultaneously detecting illumination scattered light in a plurality of directions. However, since increasing the number of sensors complicates data processing, there are cases where a plurality of detection signals are integrated. In this case, the complication of data processing is alleviated, but a scattering distribution of illumination scattered light becomes ambiguous.

An object of the present invention is to provide a defect inspection apparatus and a defect inspection method that can reduce the ambiguity of the scattering distribution of illumination scattered light due to the integration of detection signals.

Solution to Problem

In order to achieve the above object, the present invention provides a defect inspection apparatus including a sample stage for supporting a sample, an illumination optical system for irradiating the sample placed on the sample stage with illumination light, a scanning device for driving the sample stage to change the relative positions between the sample and the illumination optical system, a plurality of detection optical systems for collecting illumination scattered light from a surface of the sample, a plurality of sensors for converting the illumination scattered light collected by the corresponding detection optical systems into electrical signals and outputting detection signals, and a signal processing device for processing the detection signals input from the plurality of sensors, wherein the signal processing device generates a first signal group including an integrated signal obtained by adding a plurality of detection signals in a predetermined combination based on a group of detection signals input from the plurality of sensors, generates a second signal group by performing the filtering processing on each signal that configures the first signal group, generates a third signal group including separated signals separated according to a predetermined rule from the signal corresponding to the integrated signal based on the second signal group, and detects or classifies defects based on the third signal group to store defect inspection data in a memory.

Advantageous Effects of Invention

According to the present invention, it is possible to reduce the ambiguity of the scattering distribution of illumination scattered light due to the integration of detection signals.

BRIEF DESCRIPTION OF DRAWINGS

FIG. 1 is a schematic diagram of a configuration example of a defect inspection apparatus according to a first embodiment of the present invention.

FIG. 2 is a schematic diagram showing an example of a sample scanning trajectory by a scanning device provided in the defect inspection apparatus according to the first embodiment of the present invention.

FIG. 3 is a schematic diagram showing another example of the sample scanning trajectory by the scanning device provided in the defect inspection apparatus according to the first embodiment of the present invention.

FIG. 4 is a schematic diagram showing an extracted attenuator provided in the defect inspection apparatus according to the first embodiment of the present invention.

FIG. 5 is a diagram schematically showing a positional relationship between an optical axis of illumination light that is obliquely guided to a surface of the sample by an illumination optical system provided in the defect inspection apparatus according to the first embodiment of the present invention and an illumination intensity distribution shape on a cross-section of the sample cut along a plane of incidence of illumination light incident on the sample.

FIG. 6 is a diagram schematically showing the positional relationship between the optical axis of the illumination light that is obliquely guided to the surface of the sample by the illumination optical system provided in the defect inspection apparatus according to the first embodiment of the present invention and the illumination intensity distribution shape on a cross-section of the sample cut along a plane perpendicular to the plane of incidence of illumination light incident on the sample and including a normal to the surface of the sample.

FIG. 7 is a diagram showing a region where a detection optical system provided in the defect inspection apparatus according to the first embodiment of the present invention collects scattered light when viewed from above.

FIG. 8 is a configuration diagram of a detection optical system, which is provided in the defect inspection apparatus according to the first embodiment of the present invention and on which scattered light emitted from the sample in a normal direction is incident.

FIG. 9 is a view taken along line IX-IX in FIG. 8.

FIG. 10 is a schematic diagram of an example of a signal integration circuit of a signal processing device provided in the defect inspection apparatus according to the first embodiment of the present invention.

FIG. 11 is an explanatory diagram of a first example of filtering processing performed by a filter circuit of the signal processing device provided in the defect inspection apparatus according to the first embodiment of the present invention.

FIG. 12 is a schematic diagram of a second example of the filter circuit of the signal processing device provided in the defect inspection apparatus according to the first embodiment of the present invention.

FIG. 13 is a circuit diagram of a filter unit and a noise removal unit of the filter circuit of FIG. 12.

FIG. 14 is a schematic diagram of a kernel used in the filter unit of FIG. 13.

FIG. 15 is a diagram showing a difference in output signals for the same input signal in the first example in FIG. 11 and the second example in FIGS. 12 to 14.

FIG. 16 is a logic circuit diagram of a first defect candidate extraction circuit of the signal processing device provided in the defect inspection apparatus according to the first embodiment of the present invention.

FIG. 17 is a logic circuit diagram of a second defect candidate extraction circuit of the signal processing device provided in the defect inspection apparatus according to the first embodiment of the present invention.

FIG. 18 is a diagram showing a light intensity distribution of incident scattered light when a minute defect is illuminated on a hemispherical surface illustrated in FIG. 7 as viewed from above.

FIG. 19 is a model diagram of a scratch defect.

FIG. 20 is a first diagram showing the light intensity distribution of incident scattered light when the scratch defect is illuminated on the hemispherical surface illustrated in FIG. 7 as viewed from above.

FIG. 21 is a second view showing the light intensity distribution of incident scattered light when the scratch defect is illuminated on the hemispherical surface illustrated in FIG. 7 as viewed from above.

FIG. 22 is a third view showing the light intensity distribution of incident scattered light when the scratch defect is illuminated on the hemispherical surface illustrated in FIG. 7 as viewed from above.

FIG. 23 is a circuit diagram of a signal separation circuit of the signal processing device provided in the defect inspection apparatus according to the first embodiment of the present invention.

FIG. 24 is an explanatory diagram of an example of a concept of defect determination of a defect detection circuit of the signal processing device provided in the defect inspection apparatus according to the first embodiment of the present invention.

FIG. 25 is a first explanatory diagram of an example of a concept of new defect determination of a new defect determination circuit of the signal processing device provided in the defect inspection apparatus according to the first embodiment of the present invention.

FIG. 26 is a second explanatory diagram of an example of the concept of new defect determination of the new defect determination circuit of the signal processing device provided in the defect inspection apparatus according to the first embodiment of the present invention.

FIG. 27 is a third explanatory diagram of an example of the concept of new defect determination of the new defect determination circuit of the signal processing device provided in the defect inspection apparatus according to the first embodiment of the present invention.

FIG. 28 is a first configuration diagram of a configuration example of a detection optical system and a sensor provided in a defect inspection apparatus according to a second embodiment of the present invention.

FIG. 29 is a second configuration diagram of a configuration example of the detection optical system and the sensor provided in the defect inspection apparatus according to the second embodiment of the present invention.

FIG. 30 is a configuration diagram of another configuration example of the detection optical system and the sensor provided in the defect inspection apparatus according to the second embodiment of the present invention.

DESCRIPTION OF EMBODIMENTS

Embodiments of the present invention will be described below with reference to the drawings.

A defect inspection apparatus, which will be described as an application target of the present invention in the following embodiments, is used for defect inspection of a surface of a sample (wafer), which is performed during a manufacturing process of, for example, a semiconductor or the like. The defect inspection apparatus according to each embodiment is suitable for executing the process of detecting minute defects and obtaining data on the number, position, size, and type of defects at high speed.

First Embodiment

—Defect Inspection Apparatus—

FIG. 1 is a schematic diagram of a configuration example of a defect inspection apparatus 100 according to the present embodiment. The defect inspection apparatus 100 according to the present embodiment uses a sample 1 as an inspection target and detects defects such as foreign matter and dents on a surface of the sample 1, particularly defects of a type according to the purpose of inspection. As the sample 1, a disk-shaped semiconductor silicon wafer having a flat surface on which no pattern is formed is assumed as a typical example. The defect inspection apparatus 100 is configured to include a stage ST, an illumination optical system A, a plurality of detection optical systems B1 to Bn (n=1, 2 . . . ), sensors C1 to Cn, C3' (n=1, 2 . . . ), a signal processing device D, a control device E1, a user interface E2, and a monitor E3.

—Stage—

The stage ST is configured to include a sample stage ST1 and a scanning device ST2. The sample stage ST1 is a table for supporting the sample 1. The scanning device ST2 is a device that drives the sample stage ST1 to change a relative position between the sample 1 and the illumination optical system A, and although not shown in detail, includes a translation stage, a rotation stage, and a Z stage. The rotation stage is supported by the translation stage via the Z stage, and the sample stage ST1 is supported by the rotation stage. The translation stage horizontally translates together with the rotation stage, and the rotation stage rotates around the vertically extending axis. The Z stage functions to adjust a height of the surface of the sample 1.

FIG. 2 is a schematic diagram showing a scanning trajectory of the sample 1 by the scanning device ST2. As will be described later, the illumination spot BS on the surface of the sample 1 is irradiated with the illumination light emitted from the illumination optical system A. The illumination spot BS has an illumination intensity distribution that is long in one direction as shown in FIG. 2. A long axis direction of the illumination spot BS is assumed to be s2, and a direction intersecting a long axis (for example, a short axis direction orthogonal to the long axis) is assumed to be s1. As the rotation stage rotates, the sample 1 rotates, and the illumination spot BS is scanned in an s1 direction relative to the surface of the sample 1. As the translation stage translates, the sample 1 moves in a horizontal direction and the illumination spot BS is scanned in an s2 direction relative to the surface of the sample 1. As the sample 1 moves while rotating due to the operation of the scanning device ST2, the illumination spot BS moves in a spiral trajectory from a center to an outer edge of the sample 1 as shown in FIG. 2 and the entire surface of the sample 1 is scanned. The illumination spot BS moves in the s2 direction by a distance equal to or less than a length of the illumination spot BS in the s2 direction during one rotation of the sample 1.

It is also possible to apply a scanning device having a configuration in which, instead of the rotary stage, another translation stage having a movement axis extending in a direction intersecting a movement axis of the translation stage in a horizontal plane is provided. In this case, as shown in FIG. 3, the illumination spot BS moves in a folded linear trajectory instead of a spiral trajectory and the surface of the sample 1 is scanned. Specifically, a first translation stage is translated at a constant speed in the s1 direction, and a second translation stage is driven in the s2 direction by a predetermined distance (for example, a distance equal to or less than the length of the illumination spot BS in the s2 direction). After that, the first translation stage is turned back again in the s1 direction and translationally driven. As a result, the entire surface of the sample 1 is scanned by repeating linear scanning of the illumination spot BS in the s1 direction and movement of the illumination spot BS in the s2 direction. Compared to this scanning method, since a spiral scanning method shown in FIG. 2 does not involve reciprocating motion, it is advantageous in inspecting the sample in a short time.

—Illumination Optical System—

The illumination optical system A shown in FIG. 1 is configured to include an optical element group for irradiating the sample 1 placed on the sample stage ST1 with desired illumination light. The illumination optical system A includes, as shown in FIG. 1, a laser light source A1, an attenuator A2, an emitted light adjustment unit A3, a beam expander A4, a polarization control unit A5, a condensing optical unit A6, reflecting mirrors A7 to A9, and the like.

Laser Light Source

The laser light source A1 is a unit that emits a laser beam as illumination light. When the defect inspection apparatus 100 detects a minute defect in the vicinity of the surface of the sample 1, the laser light source A1 is used that oscillates a high-output laser beam with an output of 2 W or more with a short wavelength (wavelength 355 nm or less) ultraviolet or vacuum ultraviolet that is difficult to penetrate into the sample 1. A diameter of the laser beam emitted by the laser light source A1 is typically about 1 mm. When the defect inspection apparatus 100 detects a defect inside the sample 1, the laser light source A1 that oscillates a visible or infrared laser beam that has a long wavelength and easily penetrates into the sample 1 is used.

Attenuator

FIG. 4 is a schematic diagram showing the attenuator A2 extracted. The attenuator A2 is a unit that attenuates the light intensity of the illumination light from the laser light source A1, and in the present embodiment, a configuration in which a first polarizing plate A2a, a half-wave plate A2b, and a second polarizing plate A2c are combined is illustrated. The half-wave plate A2b is configured to be rotatable around an optical axis of the illumination light. The illumination light incident on the attenuator A2 is converted into linear polarization by the first polarizing plate A2a, then a polarization direction is adjusted to a slow axis azimuth angle of the half-wave plate A2b, and passes through the second polarizing plate A2c. By adjusting the azimuth angle of the half-wave plate A2b, it is possible to attenuate the light intensity of the illumination light at any ratio. When the degree of linear polarization of the illumination light incident on the attenuator A2 is sufficiently high, the first polarizing plate A2a can be omitted. The attenuator A2 is not limited to the configuration shown in FIG. 4, can be configured to use an ND filter having a gradation density distribution, and can also be configured to be able to adjust the attenuation effect by combining a plurality of ND filters having different densities.

Emitted Light Adjustment Unit

The emitted light adjustment unit A3 shown in FIG. 1 is a unit that adjusts an angle of the optical axis of the illumination light attenuated by the attenuator A2 and is configured to include a plurality of reflecting mirrors A3a and A3b in the present embodiment. The illumination light is sequentially reflected by the reflecting mirrors A3a and A3b, but in the present embodiment, an illumination light incidence/emission surface with respect to the reflecting mirror A3a is configured to be perpendicular to the illumination light incidence/emission surface with respect to the reflecting mirror A3b. The incidence/emission surface is a surface including the optical axis incident on the reflecting mirror and the optical axis output from the reflecting mirror. For example, if a three-dimensional XYZ orthogonal coordinate system is defined, and illumination light is incident on the reflecting mirror A3a in a +X direction, although it is different from the schematic diagram of FIG. 1, the illumination light is deflected in a +Y direction by the reflecting mirror A3a and in a +Z direction by the reflecting mirror A3b, for example. In this example, the illumination light incidence/emission surface with respect to the reflecting mirror A3a is an XY plane, and the incidence/emission surface with respect to the reflecting mirror A3b is a YZ plane. Although not shown, the reflecting mirrors A3a and A3b are provided with a mechanism for translating the reflecting mirrors A3a and A3b and a mechanism for tilting the reflecting mirrors A3a and A3b respectively. The reflecting mirrors A3a and A3b are translated, for example, in a direction of incidence or emission of the illumination light with respect to the reflecting mirrors A3a and A3b, and tilted around a normal to the incidence/emission surface. As a result, for example, offset amount and angle in the XZ plane and offset amount and angle in the YZ plane can be independently adjusted for the optical axis of the illumination light emitted in the +Z direction from the emitted light adjustment unit A3. Although the configuration using two reflecting mirrors A3a and A3b is illustrated in this example, a configuration using three or more reflecting mirrors is also possible.

Beam Expander

The beam expander A4 is a unit that expands a luminous flux diameter of incident illumination light and has a plurality of lenses A4a and A4b. An example of the beam expander A4 is a Galilean type in which a concave lens is used as the lens A4a and a convex lens is used as the lens A4b. The beam expander A4 is provided with a spacing adjustment mechanism (zoom mechanism) for the lenses A4a and A4b, and adjusting a spacing between the lenses A4a and A4b changes a magnifying power of the luminous flux diameter. The magnifying power of the luminous flux diameter by the beam expander A4 is, for example, about 5 to 10 times. In this case, if a beam diameter of the illumination light emitted from the laser light source A1 is 1 mm, a beam system of the illumination light is enlarged to 5 to 10 mm. When the illumination light incident on the beam expander A4 is not a parallel luminous flux, it is possible to collimate with the luminous flux diameter by adjusting the spacing between the lenses A4a and A4b (quasi-collimation of luminous flux). However, the collimation of the luminous flux may be performed by installing a collimator lens upstream of the beam expander A4 and separately from the beam expander A4.

The beam expander A4 is installed on a translation stage with two axes (two degrees of freedom) or more and is configured so that the position can be adjusted so that the incident illumination light and the center match. In addition, the beam expander A4 also has a tilt angle adjustment function for two axes (two degrees of freedom) or more so that the incident illumination light and the optical axis match.

Polarization Control Unit

The polarization control unit A5 is an optical system that controls a polarization state of illumination light and is configured to include a half-wave plate A5a and a quarter-wave plate A5b. For example, when oblique incident illumination is used with a reflecting mirror A7, which will be described later, placed in an optical path, by making the illumination light P-polarization with the polarization control unit A5, an amount of scattered light from defects on the surface of the sample 1 increases compared to polarization other than P-polarization. When scattered light (referred to as haze) from minute irregularities on the surface of the sample itself interferes with the detection of minute defects, by making the illumination light S-polarization, haze can be reduced compared to polarization other than S-polarization. It is also possible to use the polarization control unit A5 to make the illumination into circular polarization or 45-degree polarization between P-polarization and S-polarization.

Reflecting Mirror

As shown in FIG. 1, the reflecting mirror A7 is moved in parallel in a direction of an arrow by a drive mechanism (not shown) to move in and out of the optical path of the illumination light directed toward the sample 1, thereby making it possible to switch an incident path of the illumination light to the sample 1. By inserting the reflecting mirror A7 into the optical path, the illumination light emitted from the polarization control unit A5 as described above is reflected by the reflecting mirror A7 and obliquely incident on the sample 1 via the condensing optical unit A6 and the reflecting mirror A8. On the other hand, when the reflecting mirror A7 is removed from the optical path, the illumination light emitted from the polarization control unit A5 is incident on the sample 1 perpendicularly via a reflecting mirror A9, a polarization beam splitter B'3, a polarization control unit B'2, a reflecting mirror B'1, and a detection optical system B3.

FIGS. 5 and 6 are schematic diagrams showing a positional relationship between the optical axis of the illumination light that is obliquely guided to the surface of the sample 1 by the illumination optical system A and an illumination intensity distribution shape. FIG. 5 schematically shows a cross-section of the sample 1 cut along a plane of incidence of the illumination light incident on the sample 1. FIG. 6 schematically shows a cross-section of the sample 1 cut along a plane perpendicular to the plane of incidence of the illumination light incident on the sample 1 and including a normal to the surface of the sample 1. The plane of incidence is a plane including an optical axis OA of the illumination light incident on the sample 1 and the normal to the surface of the sample 1. FIGS. 5 and 6 show a part of the illumination optical system A extracted, and for example, the emitted light adjustment unit A3 and the reflecting mirrors A7 and A8 are omitted.

When the reflecting mirror A7 is inserted into the optical path, the illumination light emitted from the laser light source A1 is condensed by the condensing optical unit A6, reflected by the reflecting mirror A8, and obliquely incident on the sample 1. In this manner, the illumination optical system A is configured so that illumination light can be incident on the sample 1 from a direction that is inclined with respect to the normal to the surface of the sample 1. The oblique incident illumination is adjusted for the light intensity by the attenuator A2, the luminous flux diameter by the beam expander A4, and the polarization by the polarization control unit A5 to make the illumination intensity distribution uniform within the plane of incidence. Like the illumination intensity distribution (illumination profile) LD1 shown in FIG. 5, the illumination spot formed on the sample 1 has a Gaussian light intensity distribution in the s2 direction, and a length of a beam width l1 defined by 13.5% of a peak is, for example, about 25 µm to 4 mm.

In a plane orthogonal to the plane of incidence and the sample surface, the illumination spot has a light intensity distribution in which a peripheral intensity is weak with respect to a center of the optical axis OA, like the illumination intensity distribution (illumination profile) LD2 shown in FIG. 6. Specifically, the illumination intensity distribution becomes an intensity distribution similar to a Gaussian distribution reflecting the intensity distribution of light incident on the condensing optical unit A6, or Bessel function of the first kind of order 1 or sinc function reflecting an aperture shape of the condensing optical unit A6. In order to reduce haze generated from the surface of the sample 1, a length l2 of the illumination intensity distribution in the plane orthogonal to the plane of incidence and the sample surface is set to be shorter than the beam width l1 shown in FIG. 5, for example, about 1.0 µm to 20 µm. The length l2 of the illumination intensity distribution is a length of a region having an illumination intensity of 13.5% or more of a maximum illumination intensity in the plane orthogonal to the plane of incidence and the sample surface.

An incident angle of the oblique incident illumination with respect to the sample 1 (the inclination angle of the incident optical axis with respect to the normal to the sample surface) is adjusted to an angle suitable for detecting minute defects by the positions and angles of the reflecting mirrors A7 and A8. The angle of the reflecting mirror A8 is adjusted by an adjusting mechanism A8a. For example, the larger the incident angle of the illumination light with respect to the sample 1 (the smaller an illumination elevation angle, which is an angle formed by the sample surface and the incident optical axis), the weaker haze that becomes noise for scattered light from minute foreign matters on the sample surface, and thus, it is suitable for detecting minute defects. From the viewpoint of reducing the influence of haze on the detection of minute defects, it is preferable to set the incident angle of the illumination light, for example, to 75 degrees or more (elevation angle of 15 degrees or less). On the other hand, in the oblique incident illumination, the smaller the illumination incident angle, the greater an absolute amount of scattered light from minute foreign matters, and thus, from the viewpoint of increasing the amount of scattered light from defects, it is preferable to set the incident angle of the illumination light, for example, to 60 degrees or more and 75 degrees or less (elevation angle of 15 degrees or more and 30 degrees or less).

—Detection Optical System—

The detection optical systems B1 to Bn (n=1, 2, . . . ) are units that condense the illumination scattered light from the sample surface and are configured to include a plurality of optical elements including a condensing lens (objective lens). The n in the detection optical system Bn represents the number of detection optical systems, and the case where the defect inspection apparatus 100 of the present embodiment is provided with 13 sets of detection optical systems will be described as an example (n=13).

FIG. 7 is a diagram showing a region where the detection optical systems B1 to B13 collect the scattered light when viewed from above, and corresponds to the arrangement of respective objective lenses of the detection optical systems B1 to B13. In the following description, with an incident direction of the oblique incident illumination on the sample 1 as a reference, a traveling direction of the incident light (right direction in FIG. 7) with respect to the illumination spot BS on the surface of the sample 1 as viewed from above is treated as forward, and an opposite direction (left direction in FIG. 7) is treated as backward. Therefore, a lower side in FIG. 7 is a right side and an upper side is a left side with respect to the illumination spot BS.

Respective objective lenses of the detection optical systems B1 to B13 are arranged along an upper half hemispherical surface of a sphere (celestial sphere) centered on the illumination spot BS for the sample 1. The hemispherical surface is divided into 13 regions L1 to L6, H1 to H6, and V, and the detection optical systems B1 to B13 collect and condense the scattered light in the corresponding regions.

The region V is a region that overlaps with the zenith and is located directly above the illumination spot BS formed on the surface of the sample 1.

The regions L1 to L6 are regions obtained by equally dividing an annular region surrounding 360 degrees around the illumination spot BS at a low position and are arranged counterclockwise in order of the regions L1, L2, L3, L4, L5, and L6 from the incident direction of the oblique incident illumination when viewed from above. Of these regions L1 to L6, the regions L1 to L3 are located on the right side with respect to the illumination spot BS, the region L1 is located to a right rear of the illumination spot BS, the region L2 is located on the right side of the illumination spot BS, and the region L3 is located to a right front of the illumination spot BS. The regions L4 to L6 are located on the left side with respect to the illumination spot BS, the region L4 is located to a left front of the illumination spot BS, the region L5 is located on the left side of the illumination spot BS, and the region L6 is located to a left rear of the illumination spot BS.

The remaining regions H1 to H6 are regions obtained by equally dividing an annular region surrounding 360 degrees around the illumination spot BS at a high position (between the regions L1 to L6 and the region V) and are arranged counterclockwise in order of the regions H1, H2, H3, H4, H5, and H6 from the incident direction of the oblique incident illumination when viewed from above. The high-angle regions H1 to H6 are displaced from the low-angle regions L1 to L6 by 30 degrees when viewed from above. Of the regions H1 to H6, the region H1 is located behind the illumination spot BS, and the region H4 is located ahead of the illumination spot BS. The regions H2 and H3 are located on the right side with respect to the illumination spot BS, the region H2 is located to the right rear of the illumination spot BS, and the region H3 is located to the right front of the illumination spot BS. The regions H5 and H6 are located on the left side with respect to the illumination spot BS, the region H5 is located to the left front of the illumination spot BS, and the region H6 is located to the left rear of the illumination spot BS.

The scattered lights incident on the detection optical systems B1 to Bn in FIG. 1 are respectively condensed and guided to the corresponding sensors C1 to Cn. When FIG. 1 and FIG. 7 are compared, for example, the optical system in which the detection optical system B1 in FIG. 1 condenses the scattered light in the region L4 in FIG. 7, the detection optical system B2 in FIG. 1 condenses the scattered light in the region L6 in FIG. 7, and the detection optical system B3 in FIG. 1 condenses the scattered light in the region V in FIG. 7, can be illustrated. In the present embodiment, the scattered light incident on the detection optical system B3 is path-branched by the reflecting mirror B'1 and guided to the sensor C3' as well as the sensor C3.

FIG. 8 is a configuration diagram of the detection optical system B3 on which scattered light emitted from the sample 1 in a normal direction is incident, and FIG. 9 is a view taken along line IX-IX in FIG. 8. The detection optical system B3 is configured to include a condensing lens (objective lens) B3*a* and an imaging lens B3*b*, and the scattered light condensed by the condensing lens B3*a* is guided to the sensor C3 by the imaging lens B3*b*. This point is the same as other detection optical systems B1, B2, B4, . . . . The detection optical system B3 differs from the other detection optical systems in that the reflecting mirror B'1 is arranged at the position of its own pupil between the condensing lens B3*a* and the imaging lens B3*b*. As described above, during epi-illumination, the illumination light is incident on the sample 1 from the normal direction via the reflecting mirror B'1. Accordingly, the condensing lens B3*a* of the detection optical system B3 also serves as a condensing lens for guiding the epi-illumination to the sample 1.

On the other hand, the reflecting mirror B'1 also serves to branch the optical path of part of the scattered light incident on the detection optical system B3 from the illumination spot BS by the oblique incident illumination or the epi-illumination. As described above, the illumination spot BS has a long linear intensity distribution in the s2 direction. As shown in FIG. 9, the reflecting mirror B'1 is longer than the spot BS in the short axis direction (s1 direction) of the linear illumination spot BS when viewed from the sensor C3 side, and is shorter than the spot BS in the long axis direction (s2 direction) of the illumination spot BS. As a result, the scattered light that is incident on the detection optical system B3 from the sample 1 and does not interfere with the reflecting mirror B1' is incident on the sensor C3 via the imaging lens B3*b*, but the scattered light that interferes with the reflecting mirror B'1 is reflected by the reflecting mirror B'1.

Scattered light incident on the detection optical system B3 from the sample 1 and reflected by the reflecting mirror B'1 is guided to the sensor C3' via the polarization control unit B'2, the polarization beam splitter B'3, and the imaging lens B'4. Like the polarization control unit A5, the polarization control unit B'2 includes a quarter-wave plate B'a and a half-wave plate B'b, and can adjust the illumination scattered light incident from the reflecting mirror B'1 into any polarization. At the time of the oblique incident illumination, the polarization of the illumination scattered light incident on the polarization beam splitter B'3 is controlled by the polarization control unit B'2 so that the illumination scattered light reflected by the reflecting mirror B'1 is transmitted through the polarization beam splitter B'3 and is incident on the imaging lens B'4. Further, even under epi-illumination conditions in which the reflecting mirror A7 is removed from the optical path, the polarization of the illumination light can be controlled by the polarization control unit B'2 so that the illumination light traveling toward the sample 1 is polarized in any direction (for example, circular polarization) and incident on the detection optical system B3.

—Sensor—

The sensors C1 to Cn and C3' are single-pixel point sensors that convert illumination scattered light condensed by the corresponding detection optical system into electrical signals and output detection signals and can use, for example, a photomultiplier tube, SiPM (silicon photomultiplier tube) that photoelectrically converts a weak signal with high gain. Sensors C1, C2, C3, . . . correspond to detection optical systems B1, B2, B3, . . . . As described above, the sensor C3' in addition to the sensor C3 corresponds to the detection optical system B3. The detection signals output from the sensors C1 to Cn and C3' are input to the signal processing device D at any time.

—Control Device—

The control device E1 is a computer that collectively controls the defect inspection apparatus 100, and is configured to include a ROM, a RAM, and other memories, as well as a CPU, an FPGA, a timer, and the like. The control device E1 is connected to the user interface E2, the monitor E3, and the signal processing device D by wire or wirelessly. The user interface E2 is a device through which a user inputs various operations, and various input devices such as a keyboard, mouse, and touch panel can be appropriately employed. The control device E1 receives encoders for the rotation stage and the translation stage, inspection conditions that are input from the user interface E2 in response to the operator's operations, and the like. The inspection conditions include, for example, the type, size, shape, material, illumination conditions, and detection conditions of the sample 1. In addition, the control device E1 outputs a command signal for commanding the operation of the stage ST, the illumination optical system A, and the like according to the inspection conditions, and outputs coordinate data of the illumination spot BS synchronized with a defect detection signal to the signal processing device D. The control device E1 also displays and outputs the result of defect inspection by the signal processing device D on the monitor E3. As shown in FIG. 1, a DR-SEM (Defect Review-Scanning Electron Microscope), which is an electron microscope for defect inspection, may be connected to the control device E1. In this case, data on the defect inspection result can also be received from the DR-SEM by the control device E1 and transmitted to the signal processing device D.

—Signal Processing Device—

The signal processing device D is a computer that processes the detection signals input from the sensors C1 to Cn and C3' and is configured to include a ROM, a RAM, and other memories, as well as a CPU, an FPGA, a timer, and the like, like the control device E1. As an example, it is assumed that the signal processing device D is configured by a single computer forming a unit with a device main body (stage, illumination optical system, detection optical system, sensor, and the like) of the defect inspection apparatus 100, but the signal processing device D may be configured by a plurality of computers. In this case, the server can also be used for one of the plurality of computers. This is an example in which a server is included as a component of the defect inspection apparatus 100. For example, a computer attached to the device main body can obtain the defect detection signal from the device main body, process the detection data as necessary, transmit the detection data to the server, and execute processing such as defect detection and classification on the server.

In the present embodiment, the signal processing device D is configured to include a signal integration circuit D1, a filter circuit D2, a signal separation circuit D3, a defect detection circuit D4, and a new defect determination circuit D5. Each of these circuits can be configured by an FPGA, for example. Also, at least some of the functions of these circuits (especially downstream processes) can be executed by the server.

—Signal Integration Circuit—

FIG. 10 is a schematic diagram of an example of the signal integration circuit D1 of the signal processing device D. When a detection signal α photoelectrically converted by the sensors C1 to C13, and C3' is input to the signal processing device D, the detection signal α is converted to a digital signal by an A/D converter (not shown) and input to the signal integration circuit D1. Hereinafter, each detection signal α input to the signal integration circuit D1 is distinguished with a suffix of the region (regions L1 to L6, H1 to H6, and V described in FIG. 7) where the scattered light as a basis is collected. The signal integration circuit D1 is configured to include a plurality of adders, and based on a group of detection signals simultaneously input from a plurality of sensors, a first signal group including at least one integrated signal obtained by adding a plurality of detection signals in a predetermined combination is generated and output. The output first signal group is recorded in a memory (for example, the memory of the signal processing device D or a device connected thereto).

The "a group of detection signals" refers to a signal group consisting of detection signals $\alpha L1$ to $\alpha L6$, $\alpha H1$ to $\alpha H6$, and $\alpha V$ having the same detection time. The "first signal group" is a signal group consisting of signals $\beta L1$ to $\beta L6$, $\beta H1$ to $\beta H6$, and $\beta V$ obtained by adding other detection signals as necessary under a predetermined rule, based on these simultaneously detected detection signals $\alpha L1$ to $\alpha L6$, $\alpha H1$ to $\alpha H6$, and $\alpha V$, respectively, as constituent signals.

In the case of the oblique incident illumination, an intensity of the scattered light scattered forward from the sample surface is generally relatively high, and a detection sensitivity of the scattered light is lower in a rear region than in a front region. Therefore, in the present embodiment, the signal integration circuit D1 generates an integrated signal by adding at least one other detection signal to one detection signal based on backscattered light and outputs the integrated signal instead of an original signal with a low value for the detection signal of the backscattered light. A signal based on the backscattered light is amplified to a signal level suitable for processing by the filter circuit D2.

At this time, it is considered the case where a space above the sample 1 is divided into left and right by a plane including the optical axis OA (FIG. 1) of the illumination light incident on the sample 1 and the normal to the sample 1, that is, the case where the space above the sample 1 is divided into left and right of the illumination spot BS. In the present embodiment, the signal integration circuit D1 is configured to add detection signals detected by a plurality of detection optical systems having respective objective lenses arranged in a space on the same sides of the left and right when generating the integrated signal. Specifically, in the space on the same side, the detection signal based on the illumination scattered light scattered forward is added to the detection signal based on the illumination scattered light scattered backward when viewed in the incident direction of the illumination light. Further, detection signals of low-angle scattered light are added to the detection signals of low-angle scattered light, and detection signals of high-angle scattered light are added to the detection signals of high-angle scattered light. For example, the detection signal αL4 resulting from the scattered light supplemented in the left front low-angle region L4 is added to the detection signal αL6 resulting from the scattered light supplemented in the left rear low-angle region L6.

On the other hand, the signal integration circuit D1 outputs at least one of the plurality of detection signals based on the illumination scattered light scattered forward as an element of the first signal group as a non-integrated signal without adding other signals. This is because the detection signal of the forward scattered light originally has a high signal level, and if the detection signal of the forward scattered light is combined with other signals, the reliability may rather decrease.

Specifically, in the present embodiment, based on a group of detection signals αL1 to αL6, αH1 to αH6, and αV, as shown in FIG. 10, signals βL1 to βL6, βH1 to βH6, and βV configuring the first signal group are calculated by the combinations as follows.

βL1=αL1(+αL2+αL3): integrated signal
βL2=αL2 (+αL3): integrated signal
βL3=αL3: non-integrated signal
βL4=αL4: non-integrated signal
βL5=αL5(+αL4): integrated signal
βL6=αL6(+αL4+αL5): integrated signal
βH1=αH1 (+αH2+αH3+αH4+αH5+αH6): integrated signal
βH2=αH2 (+αH3): integrated signal
βH3=αH3: non-integrated signal
βH4=αH4 (+αH3+αH5): integrated signal
βH5=αH5: non-integrated signal
βH6=αH6(+αH5): integrated signal
βV=αV (non-integrated signal)

—Filter Circuit—

The filter circuit D2 performs filtering processing on the signals βL1 to βV, βH1 to βH6, and βV that configure the first signal group generated by the signal integration circuit D1, and the signals γL1 to γL6, γH1 to γH6, and γV that configure a second signal group are generated and output. The output second signal group is recorded in a memory (for example, the memory of the signal processing device D or a device connected thereto). Simply, when the signal value of any of the signals βL1 . . . βV is less than the corresponding set value, the process of removing data of the first signal group can be performed. However, in the present embodiment, the filter circuit D2 performs filtering processing on each of the signals βL1 . . . βV that configure the first signal group, based on the illumination profile of the illumination spot BS on the surface of the sample 1.

First Example of Filter Circuit

FIG. 11 is an explanatory diagram of a first example of filtering processing performed by the filter circuit D2 of the signal processing device D. A horizontal axis represents time, and a vertical axis represents signal values. The time represented by the horizontal axis corresponds to the θ coordinate of the signal sampling point on the same r coordinate line on the surface of the sample 1. A signal waveform shown in FIG. 11 is a waveform obtained when a predetermined minute foreign matter passes through the illumination spot BS. The signal waveform is represented by the sum of the haze from the sample and the amount of scattered light from minute foreign matters. Haze does not change abruptly on the sample surface, whereas a signal from minute foreign matters changes abruptly, and thus, the haze and the signal from minute foreign matters can be separated by applying a low-frequency cut filter to the input signal. The signal that passes through the low-frequency cut filter corresponds to the illumination profile of the illumination spot BS in the s1 direction (rotational direction of the sample 1 when scanning in a spiral trajectory).

Regarding the characteristics of the illumination profile, for example, a minimum value of the signal for a predetermined time T1 (for example, the time corresponding to the length l2 in FIG. 6) is defined to be equal to or greater than a first threshold Thmin and a maximum value of the signal for the same predetermined time T1 is defined to be equal to or greater than a second threshold Thmax. As a result, for any of the signals β (for example, the signal βL1) input to the filter circuit D2, when the minimum value of the signal for the predetermined time T1 is equal to or greater than the first threshold Thmin and the maximum value is equal to or greater than the second threshold Thmax, it can be determined that there is a possibility that the signal is scattered light from a defect.

Since the illumination profile typically takes a Gaussian profile, a DC component signal is included, and the low-frequency cut signal weakens not only the haze but also a foreign matter signal. Therefore, when it is determined that there is a possibility that the signal is scattered light from a discrete defect, for example, a difference between an average light amount including a signal section of the predetermined time T1 and an average light amount not including the signal section is added to the signal that passes through the low-frequency cut filter. For example, by using this value as a signal γ (for example, the signal γL1) of the coordinates corresponding to a central time of the predetermined time T1, a decrease in the scattered light intensity from the foreign matter due to the low-frequency cut filter is reduced. Since this correction is not performed when it is not determined that there is a possibility that the signal is scattered light from a defect, it is likely to be determined as a defect candidate at a later stage by being determined as the foreign matter signal. This processing is similarly executed for each signal β, defect candidates are extracted under predetermined determination conditions from the signal γ calculated for the same coordinates, and the defect candidate signal γ is output.

Second Example of Filter Circuit

FIG. 12 is a schematic diagram of a second example of the filter circuit D2 of the signal processing device D, FIG. 13 is a circuit diagram of a filter unit and a noise removal unit of the filter circuit D2 of FIG. 12, and FIG. 14 is a schematic diagram of a kernel used in the filter unit of FIG. 13. In the case of the filtering method such as the first example described with reference to FIG. 11, since a signal intensity exceeding the first threshold Thmin and the second threshold Thmax is required, if the amount of scattered light is insufficient even if the signal is scattered light from an actual foreign matter, defect candidates are not extracted. The second example of the filter circuit D2 described with reference to FIGS. 12 to 14 is an example that is advantageous in detecting defects with a small amount of scattered light compared to the first example.

The filter circuit D2 illustrated in FIG. 12 is configured to include memory units ML1 to ML6, MH1 to MH6, and MV, filter units FL1 to FL6, FH1 to FH6, and FV, noise removal units RL1 to RL6, RH1 to RH6, and RV, and a defect candidate extraction circuit D2a. The memory units ML1 . . . MV, the filter units FL1 . . . FV, the noise removal unit RL1 . . . RV, and the defect candidate extraction circuit D2a can be mounted on the same computer but can be separately mounted on different computers. For example, the processing of the memory units ML1 . . . MV and the filter units FL1 . . . FV can be executed by the computer attached to the device main body, and the processing of the noise removal units RL1 . . . RV and the defect candidate extraction circuit D2a can be executed by the server.

The memory units ML1 . . . MV are circuits for storing and accumulating the corresponding signals 3. For example, the signal βL1 is sequentially recorded in the memory unit ML1 and the signal RL2 is sequentially recorded in the memory unit ML2. The filter units FL1 . . . FV are circuits that divide the signal β for a given time recorded in the corresponding memory unit M into two channels and perform cross-correlation calculations with the illumination profile. The noise removal units RL1 . . . RV are circuits for determining noise such as electrical noise and shot noise based on the deviation of the two components obtained by the cross-correlation calculation, and determining the signal γ to be output.

Focusing on individual signals of the constituent signals of the first signal group output from the signal integration circuit D1, specific processing of individual signals in the filter circuit D2 will be described below. In the following description, the processing performed by the filter unit FL1 and the noise removal unit RL1 on the signal βL1 will be described, but the processing performed by the filter units FL2 . . . FV and the noise removal units RL2 . . . RV on the other signals βL2 . . . βV is also the same.

As shown in FIG. 13, the filter unit FL1 reads the signal βL1 recorded in the memory unit ML1 in chronological order and extracts high-frequency components of each signal. In FIG. 13, the configuration in which a low-frequency component of the signal βL1 is extracted by an LPF (low-frequency filter), and the high-frequency component is extracted by subtracting the extracted low-frequency component from the original signal βL1 is illustrated, but the circuit configuration can be changed as appropriate. The signal βL1 from which these low-frequency components are cut is alternately distributed in chronological order and separated into two channels in the filter unit FL1.

The filtering processing is performed on the signal βL1 distributed to two channels by cross-correlation calculation with the corresponding kernel. The kernels used for the cross-correlation calculation are data corresponding to the illumination profile of the illumination spot BS as shown in FIG. 14, and kernel XcorA for the first channel and kernel XcorB for the second channel are prepared. The configuration data of the kernels XcorA and XcorB corresponds to data on the illumination profile of the illumination spot BS in the s1 direction extracted at intervals of two sampling periods of the detection signal. The signal waveform shown in FIG. 11 is obtained by superimposing the kernels XcorA and XcorB. The signal βL1 distributed to the first channel is cross-correlated with the kernel XcorA, and the signal βL1 distributed to the first channel is cross-correlated with the kernel XcorB. Values that are sequentially calculated in the first channel and the second channel are recorded in a memory as necessary and output to the noise removal unit RL1. The processing up to this point is executed by the filter unit FL1.

The noise removal unit RL1 compares two component values obtained by performing the filtering processing on two channels in the filter unit FL1. If a difference between the two component values is greater than a set value, the larger value of the two component values is removed and the smaller value is selected as the signal γL1 configuring the second signal group. If the difference between the two component values is less than the set value, an average value of the two component values is selected as the signal γL1. The selected signal γL1 is output from the noise removal unit RL1 and input to the defect candidate extraction circuit D2a. At that time, the low-frequency component separated from the signal βL1 by the LPF may be added to the signal γL1.

If the processing of the noise removal unit RL1 is described with reference to FIG. 13, the following values are respectively calculated by the calculators R1 and R2 from each component value obtained by the filtering processing in the filter unit FL1.

$$\Sigma_r\{XcorA(r)^2/\sqrt{(\Sigma_r XcorA(r)^2)}\} \qquad \text{(Expression 1)}$$

$$\Sigma_r\{XcorA(r)^2/\sqrt{(\Sigma_r XcorA(r)^2)}\} \qquad \text{(Expression 2)}$$

When scanning the sample 1 in a spiral trajectory as shown in FIG. 2, a typical minute defect is traversed by two scanning lines of the r-th round and the (r+1)-th round. Of course, the finer the spiral pitch, the more scanning lines traverse the defect. On the contrary, if there are two scanning lines traversing the defect, the component values of the same θ coordinate output from the filter unit FL1 for the same defect are two for each of the two channels. The above (Expression 1) and (Expression 2) are used to add a plurality of component values of the same θ coordinate output from the filter unit FL1 for the same defect to each channel with gain. A range of r coordinates to be added in (Expression 1) and (Expression 2) can be set to the length of the illumination spot BS in the s2 direction (for example, the beam width l1 in FIG. 5).

The values calculated by calculators R1 and R2 are input to an adder R3 and a comparator R4. The two values input from the calculators R1 and R2 to the adder R3 are summed and then multiplied by 0.5 by a multiplier R5, and an average value thereof is input to a selector R8. The average value is proportional to the signal βL1. On the other hand, the two values input from the calculators R1 and R2 to the comparator R4 are determined to be larger or smaller, and the larger value (maximum value) and the smaller value (minimum value) are identified and output. The maximum value is input from the comparator R4 to the multiplier R6, multiplied by a threshold Th (0<Th<1) in the multiplier R6, and input to an amplifier R7. Also, the minimum value is input from the comparator R4 to the selector R8 and the amplifier R7. The amplifier R7 subtracts the minimum value from the value input from the multiplier R6, and if a difference takes a positive value, the difference is amplified and output to the selector R8 as a control signal. The selector R8 selects the minimum value input from the comparator R4 if the control signal is input, selects the average value input from the multiplier R5 if no control signal is input, and the selected signal is output as the signal γL1.

In this way, if there is a difference between the two values calculated by the two channels equal to or greater than the value set by the threshold Th, the minimum value of the two values is output as the signal γL1, and if there is no difference between the two values equal to or greater than the value set by the threshold Th, the average value of the two values is output as the signal γL1. For example, if the values calculated in the two channels in the filter unit FL1 are based on the scattered light from the sample 1, it is expected that the magnitudes of the two values will be comparable. The same applies to the values calculated by the calculators R1 and R2. Therefore, if a difference between the values calculated by the calculators R1 and R2 is equal to or less than the set value, it can be determined that the signal βL1 used as the basis for the calculation is a signal based on the scattered light from the sample 1, and the average value of the values calculated by the calculators R1 and R2 can be treated as the signal γL1. On the other hand, if the values calculated by the two channels in the filter unit FL1 are greatly affected by noise, a difference occurs between the two values, and the difference exceeding the set value occurs between the values calculated by the calculators R1 and R2. In this case, the influence of noise is reduced by ignoring the maximum value of the values calculated by the calculators R1 and R2 and treating the minimum value as the signal γL1.

FIG. 15 is a diagram showing a difference in output signals for the same input signal in the first example of FIG. 11 and the second example of FIGS. 12 to 14. An upper diagram of FIG. 15 shows the signal β input to the filter circuit D2, and a lower diagram shows the signal γ calculated by the filter circuit D2. In the upper diagram of FIG. 15, a signal dependent on the defect is only a largest peak, and all other peaks are noise. As shown in the lower diagram, signals dependent on defects are clarified in both the first and second examples, but a difference in the output characteristics of the signal γ is seen between the first and second examples. The first example and the second example can be selected and adopted according to the difference in characteristics. As described above, under conditions where the amount of scattered light is insufficient, the second example is expected to produce better results in terms of defect detection accuracy than the first example shown in FIG. 11.

Defect Candidate Extraction Circuit of Filter Circuit

FIG. 16 shows a first defect candidate extraction circuit D2a1 of the filter circuit D2, and FIG. 17 shows a second defect candidate extraction circuit D2a2. The defect candidate extraction circuit D2a1 shown in FIG. 16 is a circuit for extracting signals that are candidates for defects that need to be detected (hereinafter referred to as DOI: Defect of Interest) and is configured according to the detection characteristics of the DOI to extract signals that are candidates for DOI. The defect candidate extraction circuit D2a2 shown in FIG. 17 is a circuit configured to extract signals for a wide variety of defects including not only DOIs that need to be detected but also defects that do not need to be detected (hereinafter referred to as nuisance). A defect inspection apparatus is required to have the ability to detect DOIs with accurate distinguishment of DOIs from nuisances, wafer roughness, shot noise, and the like. At least the first defect candidate extraction circuit D2a1 of the defect candidate extraction circuits D2a1 and D2a2 is mounted on the defect inspection apparatus 100 as the defect candidate extraction circuit D2a, and both of the defect candidate extraction circuits D2a1 and D2a2 can also be mounted.

First Defect Candidate Extraction Circuit

The first defect candidate extraction circuit D2a1 is intended to extract a signal caused by a DOI while properly distinguishing the DOI from signals caused by nuisances, wafer roughness, noise, and the like. The circuit shown in FIG. 16 is a configuration example of a logic circuit assuming a case where a dust foreign matter generated in a semiconductor process is used as the DOI, for example. FIG. 18 is a diagram showing the light intensity distribution of incident scattered light when a typical minute foreign matter is illuminated on the hemispherical surface described in FIG. 7 as viewed from above. As shown in FIG. 18, highly isotropic properties are assumed as the characteristics of scattered light scattered by granular DOIs that are sufficiently small with respect to an illumination wavelength, and it is expected that illumination scattered light from the DOI will be detected to the same extent not only in one of the left and right spaces but also in both left and right spaces. Also, since the DOI is a minute foreign matter, scattered light to a high-angle region is not assumed. Therefore, in the circuit of FIG. 16, only the signals γL1 to γL6 that depend on low-angle scattered light are used for determining DOI candidates.

Specifically, in the example of FIG. 16, the defect candidate extraction circuit D2a1 is configured to use minimum value selectors Da1 to Da3, binarization processors Db1 to Db3, and an OR circuit Dc1. The signals γL1 and γL6 are input to the minimum value selector Da1, and the minimum value of the signals γL1 and γL6 is input from the minimum value selector Da1 to the binarization processor Db1. If the minimum value input to the binarization processor Db1 is equal to or greater than a set value, a signal is input from the binarization processor Db1 to the OR circuit Dc1. If the minimum value input to the binarization processor Db1 is less than the set value, no signal is input from the binarization processor Db1 to the OR circuit Dc1. The signals γL1 and γL6 are signals based on scattered light scattered in the low-angle rear left-right symmetrical regions L1 and L6 in FIG. 10. If these minimum values are equal to or greater than a certain value, it means that a certain amount or more of scattered light is scattered on both the left and right sides of the low-angle rear, which meets determination conditions for scattered light scattered by the DOI.

Similarly, the signals γL2 and γL5 corresponding to the low-angle lateral left-right symmetrical regions L2 and L5 are input to the minimum value selector Da2, and the signals γL3 and γL4 corresponding to the low-angle forward left-right symmetrical regions L3 and L4 are input to the minimum value selector Da3. The signal is input from the binarization processor Db2 to the OR circuit Dc1 only when the minimum value of the signals γL2 and γL5 is input from the minimum value selector Da2 to the binarization processor Db2, and the minimum value is equal to or greater than a set value. The signal is input from the binarization processor Db3 to the OR circuit Dc1 only when the minimum value of the signals γL3 and γL4 is input from the minimum value selector Da3 to the binarization processor Db3 and the minimum value is equal to or greater than a set value. When a signal is input from at least one of the binarization processors Db1 to Db3, the OR circuit Dc1 extracts and outputs the second signal group on which the signal is based as DOI candidate signals.

Second Defect Candidate Extraction Circuit

The second defect candidate extraction circuit D2a2 is intended to extract a signal caused by a nuisance in addition to a signal caused by the DOI. Here, DOIs are dust foreign matters generated in a semiconductor process, and the nuisances are other defects such as PIDs (Polish Induced Defects) and scratches generated in a polishing process, crystal defects generated on a surface of a silicon wafer, and the like. Signals not caused by defects, for example, signals caused by wafer roughness, noise, or the like may be extracted. The circuit shown in FIG. 17 is a configuration example of a logic circuit for that purpose. Unlike the circuit in FIG. 16, which narrows down the detection target to DOIs, the circuit in FIG. 17 is configured to use the signal γH1, which depends on high-angle scattered light, in addition to the signals γL1 to γL6, which depend on low-angle scattered light. The signal γH1 is based on the summation of the detection signals of the scattered light incident on the high-angle regions H1 to H6.

In the example of FIG. 17, the defect candidate extraction circuit D2a2 is configured to use adders Da4 to Da6, binarization processors Db4 to Db7, and an OR circuit Dc2. Specifically, the signals γL1 and γL6 are input to the adder Da4, and the total value of the signals γL1 and γL6 is input from the adder Da4 to the binarization processor Db4. If the total value input to the binarization processor Db4 is equal to or greater than a set value, a signal is input from the binarization processor Db4 to the OR circuit Dc2. If the total value input to the binarization processor Db4 is less than the set value, no signal is input from the binarization processor Db4 to the OR circuit Dc2. The signals γL1 and γL6 are signals based on scattered light scattered in the low-angle rear left-right symmetrical regions L1 and L6 in FIG. 10. Events in which these total values exceed a certain value are not limited to cases in which a certain amount or more of scattered light is scattered in both the left and right sides of the low-angle rear but can be applied to many cases such as when scattered light less than a certain amount is scattered in both the left and right sides, or when a certain amount or more of scattered light is scattered on either the left or the right side. The total value may be a certain value or more due to the influence of noise without depending on scattered light.

Similarly, the signals γL2 and γL5 are input to the adder Da5, and the signals γL3 and γL4 are input to the adder Da6. If the total value of the signals γL2 and γL5 is input from the adder Da5 to the binarization processor Db5 and the total value is equal to or greater than a set value, the signal is input from the binarization processor Db5 to the OR circuit Dc2. If the total value of the signals γL3 and γL4 is input from the adder Da6 to the binarization processor Db6 and the total value is equal to or greater than the set value, the signal is input from the binarization processor Db6 to the OR circuit Dc2. Further, if the signal γH1 is input to the binarization processor Db7 and the signal is equal to or greater than a set value, a signal is input from the binarization processor Db7 to the OR circuit Dc2. When a signal is input from at least one of the binarization processors Db4 to Db7, the OR circuit Dc2 extracts and outputs the second signal group on which the signal is based. According to the defect candidate extraction circuit D2a2 of FIG. 17, an extremely large number of signals including nuisances such as scratches and crystal defects are extracted as compared with the defect candidate extraction circuit D2a1 of FIG. 16.

Characteristics of Defect Scattered Light

FIG. 18 shows the light intensity distribution of incident scattered light when illuminating a typical minute foreign matter, and FIG. 16 shows a configuration example of the defect candidate extraction circuit D2a1 using the typical minute foreign matter as a DOI. The configuration of the defect candidate extraction circuit D2a1 can take different configurations depending on the type of DOI to be detected or the typical nuisance to be eliminated.

FIG. 19 is a model diagram of a scratch defect and FIGS. 20 to 22 are diagrams showing the light intensity distribution of incident scattered light when the scratch defect is illuminated on the hemispherical surface described in FIG. 7 as viewed from above. As shown in these drawings, the scratch defect is a representative example of an anisotropic defect, has a length dimension larger than a width, and is inclined at an inclination angle θ with respect to the illumination direction of the oblique incident illumination. Illumination scattered light from the scratch defect is characterized by being scattered with different intensities to the left and right as shown in FIGS. 20 to 22. FIG. 20 shows an example of the light intensity distribution with an inclination angle θ=15°, FIG. 21 shows an example with an inclination angle θ=45°, and FIG. 22 shows an example with an inclination angle θ=75°. As shown in FIGS. 20 to 22, since the left and right scattered light intensities do not match for a scratch, the circuit shown in FIG. 16 is used to suppress the detection of a scratch that is a nuisance, and it is possible to increase the sensitivity specifically for a foreign matter that is the DOI.

Conversely, when a scratch is used as the DOI, a logic circuit for determining asymmetry is configured instead of a logic circuit for determining symmetry between left and right scattered light intensities as in the circuit of FIG. 16. By combining the minimum value selector, the maximum value selector, and the binarization processor, a circuit that outputs a signal to the OR circuit Dc1 when the maximum value of the signals γL1 and γL6 is a certain value or more and the minimum value is a certain value or less can be illustrated. Shot noise and electrical noise are also considered to have no left-right symmetry and can be applied to noise discrimination by adjusting the set value of the binarization processor.

—Signal Separation Circuit—

FIG. 23 is a circuit diagram of the signal separation circuit D3 of the signal processing device D of FIG. 1. The signal separation circuit D3 generates and outputs signals δL1 ... δV of a third signal group including separated signals separated by a predetermined rule from the signals corresponding to the integrated signal based on the signals γL1 ... γV of the second signal group. The output third signal group is recorded in a memory (for example, the memory of the signal processing device D or a device connected thereto). The separated signals are generated by subtracting other signals configuring the second signal group from at least one of the signals configuring the second signal group. For example, the signal separation circuit D3 generates separated signals by subtracting at least one other signal (for example, signal γL2) configuring the second signal group from the signal (for example, signal γL1) of the first signal group corresponding to the integrated signal (for example, signal βL1). As described above, in the present embodiment, since the integrated signal is generated by adding the detection signals on the same sides of the left and right, the base detection signals are condensed in the space on the same sides of the left and right and subtracted from each other to generate the separated signals among the signals configuring the second signal group.

Specifically, in the present embodiment, based on the signals γL1 to γL6, γH1 to γH6, and γV of the second signal group, as shown in FIG. 23, the signals δL1 to δL6, δH1 to δH6, and δV that configure the third signal group are calculated as follows.

δL1=γL1(−γL2 −γL3): separated signal
δL2=γL2 (−γL3): separated signal
δL3=γL3: non-separated signal
δL4=γL4: non-separated signal
δL5=γL5(−γL4): separated signal
δL6=γL6(−γL4 −γL5): separated signal
δH1=γH1 (−γH2+γH3 −γH4+γH5 −γH6): separated signal
δH2=γH2 (−γH3): separated signal
δH3=γH3: non-separated signal
δH4=γH4 (−γH3 −γH5): separated signal
δH5=γH5: non-separated signal
δH6=γH6(−γH5): separated signal
δV=γV (non-separated signal)

In the example of FIG. 23, the signals δL1 ... δV output from the signal separation circuit D3 correspond to the detection signals αL1 ... αV input to the signal integration circuit D1. The detection signals αL1 ... αV are once appropriately integrated for processing by the filter circuit D2, but it is desirable to separate the magnitudes of the detection signals of respective sensors when analyzing the defect in various feature value spaces in the defect detection. Therefore, a configuration is adopted in which the signal processed by the signal integration circuit D1 is separated after the filtering processing. Although FIG. 23 illustrates a configuration in which the signals δL1 . . . δV are restored to signals corresponding to the detection signals αL1 . . . αV, it is not necessary to completely restore the entire integrated signals to the base detection signals. For example, the six high-angle signals γH1 to γH6 may be output as four signals: detection signal αH3+αH4+αH5, detection signal αH6+αH1+αH2, detection signal αH2+αH3, and detection signal αH5+αH5. The detection signal αH3+αH4+αH5 corresponds to the integrated signal of the high angle front side, the detection signal αH6+αH1+αH2 corresponds to the integrated signal of the high angle rear side, the detection signal αH2+αH3 corresponds to the integrated signal of the high angle right side, and the detection signal αH5+αH5 corresponds to the integrated signal of the high angle left side.

—Defect Detection Circuit—

FIG. 24 is an explanatory diagram of an example of a concept of defect determination of the defect detection circuit D4 of the signal processing device D of FIG. 1. The defect detection circuit D4 performs a process of detecting or classifying defects based on the third signal group output from the signal separation unit D3. In the present embodiment, whether or not the detected defect is a DOI is determined by whether or not a position of the detected defect in the feature value space whose coordinate axes are selected from the signals δL1 . . . δV of the third signal group belongs to a preset determination region. In the example of FIG. 24, a feature value space is represented with the signals δL3, δL4, γH1 (=δH1+δH2+δH3+δH4+δH5+δH6) as axes. Both a cross mark and a point mark represent vectors representing the inspection results of the sample 1. A region represented by an ellipse in FIG. 24 is a determination region for determining a defect within the feature value space. In the defect detection circuit D4, a vector represented by the point mark within the determination region is determined as the DOI, and a vector represented by the cross mark outside the determination region is determined as the nuisance. Machine learning, Mahalanobis distance, deep learning, or the like can be applied to this feature value space determination. The defect inspection data determined by the defect detection circuit D4 is recorded in a memory (for example, the memory of the signal processing device D or a device connected thereto).

—New Defect Determination Process—

FIGS. 25 to 27 are explanatory diagrams of an example of a concept of new defect determination of the new defect determination circuit D5 of the signal processing device D shown in FIG. 1. Here, it is assumed that past defect inspection data of the sample 1 performed before a certain semiconductor manufacturing process P is present, for example. The defect inspection apparatus used at that time may be the defect inspection apparatus 100 of the present embodiment or another defect inspection apparatus. After performing the semiconductor manufacturing process P on the sample 1, the new defect determination circuit D5 detects new defects generated by the semiconductor manufacturing process P as DOIs when performing defect inspection with the defect inspection apparatus 100 of the present embodiment.

Specifically, in the signal processing device D, the past defect inspection data on the same sample 1 read from the memory, specifically, the defect inspection data obtained between the semiconductor manufacturing process P and the previous semiconductor manufacturing process is read out. Any of the memory of the defect inspection apparatus 100, the memory of a device (server or the like) connected to the defect inspection apparatus 100, the database DB (FIG. 1), or the like may be used as a reading source of past defect inspection data. Then, as shown in FIG. 27, cluster regions of defects in the sample 1 are set from the past defect inspection data. For example, it is determined whether the distance of each defect on the coordinates of the surface of the sample 1 for past defect inspection data to the nearest defect is equal to or less than a set distance, and the cluster region can be set by grouping and connecting two defects having a positional relationship closer than the set distance. After that, the defect inspection data newly obtained by inspecting the sample 1 after the semiconductor manufacturing process P is compared with the past defect inspection data as shown in FIG. 26. As a result of this comparison, among the defects detected in the semiconductor manufacturing process P, defects that do not match all the defects included in the past defect inspection data and that are out of the cluster region are determined as new defects generated in the semiconductor manufacturing process P and recorded in the memory.

At this time, it is desirable that past defect inspection data be data generated under conditions for detecting not only DOIs that need to be detected but also nuisances that do not need to be detected. For example, like the defect candidate extraction circuit D2a2 described above with reference to FIG. 17, conditions are set to actively detect many defects including nuisances. For the past defect inspection data, even in the defect detection process, for example, the defect determination as described with reference to FIG. 24 is not performed, and both defects inside and outside the defect determination region are included in the defect inspection data. As a result, as shown in FIG. 25, a large number of defects can be detected regardless of necessity in the past defect inspection data. For past defect inspection data, both the active nuisance detection by the defect candidate extraction circuit D2a2 and the non-removal of nuisances in the defect detection process may not be performed, but only one of the active nuisance detection and the non-removal of nuisances may be performed.

On the other hand, in the defect inspection performed after the semiconductor manufacturing process P, a specific type of defect assumed to occur in the semiconductor manufacturing process P is set as a DOI, and the DOI is targeted to extract defect candidates as in the defect candidate extraction circuit D2a1 described above with reference to FIG. 16. As for the defect inspection after the semiconductor manufacturing process P, only defects within the defect determination region are included in the defect inspection data as DOIs as described with reference to FIG. 24 even in the defect detection process.

For example, in the past defect inspection data obtained before the semiconductor manufacturing process P, a lot of noise can be detected, but the possibility that the coordinates match between the noise included in the past defect inspection data and the new defect is very low as long as the coordinate matching accuracy is ensured. From that point of view, in order to extract only new defects by taking a difference between the inspection results before and after the semiconductor manufacturing process P, it is preferable that many defects other than DOIs are detected in the past defect inspection data.

When comparing the inspection results before and after the semiconductor manufacturing process P, it is necessary to accurately match the coordinates of both inspection results. The function that can be preferably added to the new defect determination circuit D5 will be described as a process for improving the matching accuracy of the coordinates. A plurality of presumed identical defects detected in both the inspection results before and after the semiconductor manufacturing process P will be focused on. The plurality of defects can be estimated to be the same defect if there is a certain correlation between the mutual positional relationship in the past defect inspection data and the mutual positional relationship in the subsequent defect inspection data. Coordinate deviations between the plurality of defects included in the past defect inspection data thus extracted and the corresponding plurality of detected defects in the subsequent defect inspection data are calculated. The coordinate deviation is a coordinate deviation of the inspection results before and after the semiconductor manufacturing process P, and based on the coordinate deviation, the coordinate deviation of the detected defect with respect to the past defect inspection data can be corrected. After performing this coordinate correction, the inspection results before and after the semiconductor manufacturing process P are compared to determine a new defect, whereby a new defect can be determined with high accuracy. At that time, there is also a method in which the optical axis of the detection optical system is corrected by an optical axis adjustment mechanism (not shown) based on the calculated coordinate deviation, and the defect inspection data after the optical axis correction is compared with the past defect inspection data.

At that time, in the defect inspection performed after the semiconductor manufacturing process P, it is conceivable that two determination regions having different widths are used in the defect detection process (FIG. 24), and defect inspection data for the final extraction of new defects and defect inspection data for coordinate alignment are prepared. Defect inspection data for coordinate alignment sets a wider determination region than defect inspection data for new defect extraction. As a result, in addition to DOIs, nuisances with similar feature values are detected, and the number of detected defects increases. Since the DOI of the defect inspection performed after the semiconductor manufacturing process P is a new defect generated in the semiconductor manufacturing process P, it is possible that the defect detected as the DOI does not include the data already found in the past defect inspection data. On the other hand, there is a high possibility that the nuisance included in the defect inspection data for coordinate alignment is also detected in the past defect inspection data. In this way, by intentionally including defects that can be used for comparing the inspection results before and after the semiconductor manufacturing process P, coordinate alignment can be performed with high accuracy.

—New Defect Determination Method—

By using the defect inspection apparatus 100, as described above, not only isotropic defects but also anisotropic defects can be accurately detected. At the time of defect detection, the integrated signal is separated to ensure the accuracy of the feature value of the scattered light in each direction, thereby improving the defect detection accuracy. Since the defect type can be identified with high accuracy in this manner, defects that tend to occur in a specific semiconductor manufacturing process can be set as DOIs, and such defects can be detected with high accuracy. Taking advantage of this, it is possible to identify whether the detected DOI is actually a defect that occurred in the semiconductor manufacturing process, which is useful for evaluating the semiconductor manufacturing process. The new defect determination circuit D5 is as described above.

That is, first, a first inspection process of inspecting the surface of the sample 1 is performed, a predetermined semiconductor manufacturing process P is performed on the sample 1 inspected in the first inspection process, and a second inspection process of inspecting the surface of the sample 1 subjected to the predetermined semiconductor manufacturing process P is performed. On the surface of the sample 1, cluster regions of defects are set from the defect inspection data of the first inspection process. Then, the defects detected in the first inspection process and the second inspection process are associated with each other, and defects detected only in the second inspection process and outside the cluster region are determined as new defects generated in the semiconductor manufacturing process P. At this time, in the first inspection process, the sample 1 is inspected under the condition that more defects are detected than in the second inspection process, including not only DOIs that need to be detected but also nuisances that do not need to be detected. Preferably, the coordinate deviation of the defect detected in both the first inspection process and the second inspection process is specified, and the coordinate deviation of the detected defect in the second inspection process with respect to the defect inspection data of the first inspection process is corrected and new defects are determined. As a result, new defects can be detected with high accuracy.

—Effect—

(1) When oblique incident illumination is used, the intensity of scattered light to the rear side is generally weak, and an amount of detected light is insufficient depending on a direction of scattering. Therefore, the reliability of the filtering processing can be ensured by appropriately integrating the detection signals $\alpha L1 \ldots \alpha V$. However, in some cases, the signal after the integration processing is ambiguous as a feature value for finally determining the defect type. Therefore, in the present embodiment, the integrated signal is separated after the filtering processing as described above to ensure the accuracy of the feature value of the scattered light in each direction, thereby improving the accuracy of determining the defect type. As a result, it is possible to reduce the ambiguity of the scattering distribution of the illumination scattered light due to the integration of the detection signals, and it is possible to accurately detect the DOI by distinguishing the DOI from the nuisance.

(2) When the detection signals are integrated, the detection signal of scattered light scattered in the space on the left side is integrated with the detection signals of other scattered light scattered in the space on the left side. Similarly, the detection signal of the scattered light scattered in the space on the right side is integrated with the detection signal of the other scattered light scattered in the space on the right side. In the case of an anisotropic defect, the amount of scattered light is significantly different between the left and right sides as described with reference to FIGS. 20 to 22, if an integration method is adopted in which the left and right detection signals are integrated for each backscattered light, it is impossible to determine that the defect is an anisotropic defect from the integrated signal. On the other hand, in the present embodiment, by integrating the detection signals on the same sides of the left and right with respect to the illumination direction, it is possible to improve an identification sensitivity of the anisotropic defect.

(3) When oblique incident illumination is used, the intensity of scattered light to the rear side generally becomes weak. Therefore, when the integration processing is performed, mainly the detection signal of forward scattered light scattered to the same sides of the left and right (for example, left forward scattered light) is added to the detection signal of backscattered light (for example, left backward illumination scattered light). As a result, it is possible to properly amplify a detection signal having a low signal intensity while ensuring the identification sensitivity of the anisotropic defect.

(4) In addition, in the integration processing, not all detection signals are necessarily added to other detection signals, but at least one of the detection signals based on illumination scattered light scattered forward is used for the filtering processing without adding other signals. Since forward scattered light originally has a high light intensity, if a detection signal of scattered light with a low light intensity is added to the detection signal, the clarity of the feature value of the detection signal of forward scattered light may rather be impaired. Therefore, by using the forward scattered light as it is in the subsequent processing without integrating the forward scattered light with other signals, it is possible to ensure the accuracy of the filtering processing.

(5) Since the detection signals of the scattered light on the same sides of the left and right are added together, by taking a difference between the signals on the same sides of the left and right when separating, it is possible to maintain the distinction between the left and right feature values of the signals. As described above, the accuracy of defect type determination can be improved in a defect inspection apparatus that performs signal integration processing by signal separation processing. Maintaining the right and left distinction of the feature value of the signal also greatly contributes to the improvement of the accuracy of defect type determination.

(6) The filtering processing processes the signal based on the illumination profile of the illumination spot. At that time, when the defect signal is discriminated by comparison with an absolute threshold as shown in FIG. 11, even the detection signal of the signal scattered from the defect is not detected when the light amount is less than the threshold. On the other hand, as described with reference to FIGS. 13 and 14, the method of separating the signal into two channels and comparing the two component values obtained by performing cross-correlation calculations with the illumination profile for each channel can ensure a certain sensitivity for defect signals having a relatively small light amount.

(7) By setting a cluster region of defects from the past defect inspection data for the same sample, defects that do not match all the defects included in the past defect inspection data and that are out of the cluster region can be determined as new defects. Defects that form clusters are highly likely to have existed for a long time, and by excluding defects included in the cluster region from candidates for new defects, it is possible to reduce the computational load while ensuring the detection accuracy of new defects.

(8) The past defect inspection data used to determine new defects is preferably data generated under conditions for detecting not only DOIs that need to be detected but also nuisances that do not need to be detected. In this case, among the defects detected in the defect inspection performed after a specific semiconductor manufacturing process, there is a high possibility that the defects that existed before the semiconductor manufacturing process was performed have been found in the past defect inspection data. Therefore, by excluding defects that match the past defect inspection data from candidates for new defects, it is possible to ensure the detection accuracy of the new defects.

(9) The detection accuracy of the new defect can be ensured by correcting the coordinate deviation of the detected defect with respect to the past defect inspection data, based on the coordinate deviation of the defect detected in both the defect inspection data obtained before and after the semiconductor manufacturing process.

Second Embodiment

In the first embodiment, an example using a single-pixel point sensor as the sensors C1 to Cn, and C3' is described, but the present invention can also be applied to a defect inspection apparatus using a one-dimensional or two-dimensional sensor having a plurality of pixels. FIGS. 28 to 30 illustrate configurations of the detection optical system and the sensor using a sensor having a plurality of pixels. FIG. 29 is a diagram of the detection optical system shown in FIG. 28 as viewed from above in FIG. 28. FIGS. 28 and 29 illustrate configurations in which the sensor is inclined with respect to a detection optical axis. FIG. 30 illustrates a configuration in which the sensor is perpendicular to the detection optical axis.

The defect inspection apparatus of the present embodiment corresponds to the one in which each unit of the detection optical system and the sensor of the defect inspection apparatus 100 of the first embodiment is replaced with the configuration examples of FIGS. 28 and 29 or the configuration example of FIG. 30. The detection optical system B" shown in these drawings includes a condensing lens B1", a half-wave plate B2", a polarization beam splitter B3", a half-wave plate B4", cylindrical lenses B5" and B6", an image lens B7", and a beam diffuser B8". The illumination scattered light incident on the detection optical system B" is guided to a sensor C". As the sensor C", a CCD sensor, a CMOS sensor, a PSD (position sensing detector) can be used.

In the detection optical system B", the illumination scattered light is condensed by the condensing lens B1", and a polarization direction thereof is controlled by the half-wave plate B2". The half-wave plate B2" is rotatable by an actuator (not shown). An optical path of the light that passes through the half-wave plate B2" is branched according to the polarization by the polarization beam splitter B3". The combination of the half-wave plate B2" and the polarization beam splitter B3" facilitates the separation of the optical signal indicating the defect of the sample 1 and the optical signal (roughness scattered light from the surface of sample 1) that hinders the defect detection of the sample 1. The light that passes through the polarization beam splitter B3" is controlled by the half-wave plate B4" in the polarization direction suitable for detection by the sensor C". The light that passes through the half-wave plate B4" has a cross-sectional shape thereof adjusted by the optical cylindrical lenses B5" and B6", and is guided to the sensor C" via the imaging lens B7". An optical image of an illumination spot 20 is formed on the sensor C" having a plurality of pixels. Detection signals of the optical image photoelectrically converted by each pixel of the sensor C" are output from the sensor C" to the signal processing device D in the same manner as in the first embodiment. The light path-branched by the polarization beam splitter B3" is attenuated by the beam diffuser B8" so as not to become stray light.

The present invention can also be applied to a defect inspection apparatus using a plurality of sensors having a plurality of pixels. For example, the detection signals αL1 . . . αV of the first embodiment are replaced with representative values (for example, the maximum value or median value) of a plurality of detection signals output from each pixel of each sensor and the same processing as those of the first embodiment is performed, whereby the same effects as those of the first embodiment can be obtained.

Modification

In the above, the configuration of the signal integration circuit D1 (that is, the combination of signal integrations) shown in FIG. 10 is an example, and the combination of signal integrations can be changed as appropriate according to the configuration of the illumination optical system and the detection optical system and the inspection purpose. The arrangement and number of the regions L1 . . . V for detecting scattered light can also be changed as appropriate.

The first example described in FIG. 11 and the second example described in FIGS. 12 to 14 are both examples of the filtering processing executed by the filter circuit D2. If an SN ratio of the signals βL1 . . . βV output from the signal integration circuit D1 is mentioned, the contents of processing can be changed as appropriate.

As for the signal separation circuit D3, the configuration shown in FIG. 23 (that is, the combination of a signal to be subtracted and signals to be used for subtraction from the signal) is an example, and the combination of signal separation can be appropriately changed as in the signal integration circuit D1. As for the principle of defect detection by the defect detection circuit D4, the method described with reference to FIG. 24 is an example, and other methods can be employed.

REFERENCE SIGNS LIST

1: sample
100: defect inspection apparatus
A: illumination optical system
B1 to Bn, B'3, B": detection optical system
B3a: condensing lens (objective lens)
BS: illumination spot
C1 to Cn, C": sensor
D: signal processing device
ST1: sample stage
ST2: scanning device
XcorA, XcorB: kernel (illumination profile)
αL1 to αL6, αH1 to αH6, αV: detection signal
βL1 to βL6, βH1 to βH6, βV: signal (first signal group)
γL1 to γL6, γH1 to γH6, γV: signal (second signal group)
δL1 to δL6, δH1 to δH6, δV: signal (third signal group)

The invention claimed is:

1. A defect inspection apparatus comprising:
a sample stage for supporting a sample;
an illumination optical system for irradiating the sample placed on the sample stage with illumination light;
a scanning device for driving the sample stage to change the relative positions between the sample and the illumination optical system;
a plurality of detection optical systems for collecting illumination scattered light from a surface of the sample;
a plurality of sensors for converting the illumination scattered light collected by the corresponding detection optical systems into electrical signals and outputting detection signals; and
a signal processing device for processing the detection signals input from the plurality of sensors, wherein
the signal processing device
generates a first signal group including an integrated signal obtained by adding a plurality of detection signals in a predetermined combination based on a group of detection signals input from the plurality of sensors,
generates a second signal group by performing filtering processing on each signal that configures the first signal group,
generates a third signal group based on the second signal group, wherein signals in the third signal group include separated signals, which are separated from signals corresponding to the integrated signal and are generated by subtracting one or more signals configuring the second signal group from another one of the signals configuring the second signal group that corresponds to the integrated signal, and
detects or classifies defects based on the third signal group to store defect inspection data in a memory.

2. The defect inspection apparatus according to claim 1, wherein
the illumination optical system is configured to cause illumination light to be incident on the sample from a direction inclined with respect to a normal to the surface of the sample, and
when a space above the sample is divided into left and right by a plane including an optical axis of the illumination light incident on the sample and the normal to the sample, the signal processing device generates the integrated signal by adding detection signals detected by a plurality of detection optical systems in which respective objective lenses are arranged in a space on the same sides of the left and right.

3. The defect inspection apparatus according to claim 2, wherein
the signal processing device generates the integrated signal by adding the detection signal based on the illumination scattered light scattered forward to the detection signal based on the scattered illumination light scattered backward when viewed in an incident direction of the illumination light.

4. The defect inspection apparatus according to claim 3, wherein
the signal processing device includes at least one of the plurality of detection signals based on the illumination scattered light scattered forward into the first signal group without adding other signals.

5. The defect inspection apparatus according to claim 1, wherein
the signal processing device performs the filtering processing based on an illumination profile of an illumination spot formed on the surface of the sample by the illumination light for each signal configuring the first signal group.

6. The defect inspection apparatus according to claim 5, wherein
the signal processing device
alternately distributes the signals that configure the first signal group in chronological order to be separated into two channels, compares the two component values obtained by performing the filtering processing by a cross-correlation calculation with the illumination profile for each channel, and removes the larger one of the two component values and selects the smaller one as a constituent signal of the second signal group if the difference between the two component values is greater than a set value, and selects an average value of the two component values as a constituent signal of the second signal group if a difference between the two component values is less than the set value.

7. The defect inspection apparatus according to claim 1, wherein the signal processing device sets a cluster region of defects from past defect inspection data on the same sample, and a defect that does not match all the defects included in the past defect inspection data and is outside the cluster region is determined as a new defect and recorded in the memory.

8. The defect inspection apparatus according to claim 7, wherein the past defect inspection data is data generated under conditions for detecting not only defects that need to be detected but also defects that do not need to be detected.

9. The defect inspection apparatus according to claim 7, wherein the signal processing device determines the new defect after correcting the coordinate deviation of the detected defect with respect to the past defect inspection data based on a coordinate deviation between the defect included in the past defect inspection data and the corresponding detected defect.

* * * * *